(12) United States Patent
Kermani et al.

(10) Patent No.: US 11,981,380 B2
(45) Date of Patent: May 14, 2024

(54) KART

(71) Applicant: Razor USA LLC, Cerritos, CA (US)

(72) Inventors: Ali Kermani, Cerritos, CA (US); Ian Desberg, Cerritos, CA (US); Yufeng Wang, Shanghai (CN); Zhiwei Huang, Shanghai (CN)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 15/676,864

(22) Filed: Aug. 14, 2017

(65) Prior Publication Data

US 2018/0043950 A1 Feb. 15, 2018

(30) Foreign Application Priority Data

Aug. 15, 2016 (CN) .......................... 201620882608.6
Jan. 22, 2017 (WO) ................. PCT/CN2017/072086

(51) Int. Cl.
*B62D 61/08* (2006.01)
*B60K 1/04* (2019.01)
(Continued)

(52) U.S. Cl.
CPC ................ *B62D 61/08* (2013.01); *B60K 1/04* (2013.01); *B60K 7/0007* (2013.01); *B60L 50/52* (2019.02); *B60L 50/64* (2019.02); *B60L 50/66* (2019.02); *B60L 53/16* (2019.02); *B62D 9/00* (2013.01); *B62D 23/00* (2013.01); *B62D 29/004* (2013.01); *B62D 29/046* (2013.01); *B62D 63/02* (2013.01);
(Continued)

(58) Field of Classification Search
CPC ....... B62D 61/08; B62D 29/004; B60L 53/16; B60L 50/66; B60L 50/64; B60K 7/0007; B60K 2007/0092
See application file for complete search history.

(56) References Cited

U.S. PATENT DOCUMENTS

| 1,231,531 A | 6/1917 | Shilling |
| 1,932,031 A | 10/1933 | Saverio |

(Continued)

FOREIGN PATENT DOCUMENTS

| CN | 2198169 Y | 5/1995 |
| CN | 2269997 Y | 12/1997 |

(Continued)

OTHER PUBLICATIONS

Aamoth, Doug, "Razor Builds the Ultimate Drifting Go-Kart: Why Must I Always Be Over the Weight Limit for Everything Good in This World?," Jul. 11, 2013, retrieved on Aug. 6, 2016, http://techland.time.com/2013/07/11/razor-builds-the-ultimate-drifting-go-kart-why-must-i-always-be-over-the-weight-limit-for-everything-good-in-this-world/, in 2 pages.

(Continued)

*Primary Examiner* — Nicole T Verley
(74) *Attorney, Agent, or Firm* — Knobbe, Martens, Olson & Bear, LLP

(57) ABSTRACT

Various ridable karts for users are described. The ridable kart can include a kart body, a cover body, a rear caster wheel, a steering assembly, a battery, and a controller. The kart body can include an installation slot. The controller and the battery can be secured within the installation slot. The steering assembly can include a front wheel and a steering wheel. The front wheel can include a hub motor arrangement.

20 Claims, 15 Drawing Sheets

(51) Int. Cl.
*B60K 7/00* (2006.01)
*B60L 50/52* (2019.01)
*B60L 50/60* (2019.01)
*B60L 50/64* (2019.01)
*B60L 53/16* (2019.01)
*B62D 9/00* (2006.01)
*B62D 23/00* (2006.01)
*B62D 29/00* (2006.01)
*B62D 29/04* (2006.01)
*B62D 63/02* (2006.01)

(52) U.S. Cl.
CPC ............. *B60K 2001/0466* (2013.01); *B60K 2007/0038* (2013.01); *B60K 2007/0092* (2013.01); *B60L 2220/20* (2013.01); *B60Y 2200/86* (2013.01); *Y02T 10/70* (2013.01); *Y02T 10/7072* (2013.01); *Y02T 90/14* (2013.01)

(56) References Cited

U.S. PATENT DOCUMENTS

| | | |
|---|---|---|
| D134,560 S | 12/1942 | Fletcher |
| D171,210 S | 12/1953 | Jones |
| 3,062,559 A | 6/1959 | Hewitt |
| D189,614 S | 1/1961 | Beale |
| D190,024 S | 4/1961 | Rouse |
| 3,002,589 A | 10/1961 | Cook |
| 3,023,825 A | 3/1962 | Robert |
| 3,053,550 A * | 9/1962 | Kunsch .................. B60T 11/04 180/215 |
| 3,099,326 A * | 7/1963 | Weigel ................... B60K 1/00 180/214 |
| 3,125,177 A | 3/1964 | Paller |
| 3,239,872 A | 3/1966 | Kitrell |
| 3,512,599 A * | 5/1970 | Haddix ................. B62D 61/08 180/217 |
| 3,533,484 A | 10/1970 | Wood |
| 3,604,212 A | 9/1971 | Lewin |
| D222,283 S | 10/1971 | Reeves |
| 3,700,058 A | 10/1972 | Kuwahara |
| 3,799,283 A | 3/1974 | Freber |
| 3,829,117 A | 8/1974 | Park |
| 3,938,608 A | 2/1976 | Folco-Zambelli |
| 3,960,392 A | 6/1976 | Read |
| D241,153 S | 8/1976 | Majeski |
| D243,627 S | 3/1977 | Clower |
| D246,198 S | 10/1977 | Rose |
| 4,065,144 A * | 12/1977 | Winchell ............... B60G 21/00 180/217 |
| 4,073,500 A | 2/1978 | Campeau |
| D249,496 S | 9/1978 | Morgan |
| D251,264 S | 3/1979 | Cook et al. |
| D251,324 S | 3/1979 | Vaughn |
| D252,714 S | 8/1979 | Tidwell |
| D256,299 S | 8/1980 | Maccready |
| 4,281,844 A | 8/1981 | Jackman et al. |
| D266,100 S | 9/1982 | Miller |
| 4,359,231 A | 11/1982 | Mulcahy |
| 4,403,673 A | 9/1983 | Ball |
| 4,451,064 A | 5/1984 | Perkins |
| D276,058 S | 10/1984 | Rogers |
| D280,916 S | 10/1985 | Castle |
| 4,572,535 A | 2/1986 | Stewart |
| D290,451 S | 6/1987 | Engum |
| 4,682,668 A | 7/1987 | Salmon et al. |
| 4,750,578 A | 6/1988 | Brandenfels |
| 4,799,708 A | 1/1989 | Handa et al. |
| 4,826,190 A | 5/1989 | Hartmann |
| 4,886,294 A | 12/1989 | Nahachewski |
| 4,896,899 A | 1/1990 | Lawrence |
| 4,898,508 A | 2/1990 | Hayata |
| 4,915,075 A | 4/1990 | Brown |
| 4,944,360 A | 7/1990 | Sturges |
| 4,993,733 A | 2/1991 | Eilers |
| RE33,675 E | 8/1991 | Young |
| 5,036,938 A | 8/1991 | Blount et al. |
| D320,420 S | 10/1991 | Dupont |
| D320,586 S | 10/1991 | Tellinghuisen |
| 5,094,314 A | 3/1992 | Hayata |
| D332,765 S | 1/1993 | Tellinghuisen |
| D332,977 S | 2/1993 | Huffman et al. |
| 5,199,526 A | 4/1993 | Derviller |
| 5,257,671 A | 11/1993 | Watkins |
| 5,265,690 A | 11/1993 | Amundsen et al. |
| 5,340,139 A | 8/1994 | Davis |
| D355,879 S | 2/1995 | Winbald |
| D356,765 S | 3/1995 | DiMatteo |
| 5,477,936 A | 12/1995 | Sugioka et al. |
| D366,021 S | 1/1996 | Tharp |
| 5,479,998 A * | 1/1996 | Ishikawa ................ A63G 25/00 180/13 |
| 5,494,126 A | 2/1996 | Meeker |
| D369,130 S | 4/1996 | Cummings |
| D378,226 S | 2/1997 | Sundqvist |
| 5,628,379 A | 5/1997 | Watkins |
| D390,281 S | 2/1998 | O'Rourke |
| D394,164 S | 5/1998 | Safrit |
| 5,816,592 A | 10/1998 | Horton, II et al. |
| 5,826,670 A | 10/1998 | Nan |
| 5,855,385 A | 1/1999 | Hambsch |
| D404,928 S | 2/1999 | Safrit |
| D408,869 S | 4/1999 | Patmont |
| D409,538 S | 5/1999 | Isetani et al. |
| 5,904,218 A | 5/1999 | Watkins |
| D410,880 S | 6/1999 | Conterno |
| D412,138 S | 7/1999 | Triarsi et al. |
| 5,931,499 A | 8/1999 | Sutherland |
| D419,507 S | 1/2000 | Triarsi et al. |
| 6,022,049 A | 2/2000 | Wiggins, Jr. |
| 6,026,923 A | 2/2000 | Uphaus |
| 6,047,786 A | 4/2000 | Stevenson et al. |
| D424,996 S | 5/2000 | McShay, Jr. |
| 6,092,822 A | 7/2000 | Salmon |
| D433,828 S | 11/2000 | Safrit |
| D434,086 S | 11/2000 | Ford |
| 6,170,596 B1 | 1/2001 | Triarsi et al. |
| D439,871 S | 4/2001 | Goebert et al. |
| D440,607 S | 4/2001 | Mahlow |
| D445,740 S | 7/2001 | Hartog |
| 6,267,190 B1 * | 7/2001 | Micheletti ............. B62K 3/002 180/183 |
| 6,276,480 B1 | 8/2001 | Aregger |
| 6,349,786 B1 | 2/2002 | Gift |
| 6,402,174 B1 | 6/2002 | Maurer |
| D460,723 S | 7/2002 | Smit |
| D465,814 S | 11/2002 | Kovelski |
| D466,560 S | 12/2002 | Stolpmann |
| D467,088 S | 12/2002 | Haney et al. |
| D469,819 S | 2/2003 | Nicolle et al. |
| D471,936 S | 3/2003 | Tilbor et al. |
| 6,530,598 B1 | 3/2003 | Kirby |
| 6,581,947 B2 | 6/2003 | Andrews et al. |
| D482,882 S | 12/2003 | Murphy |
| D483,191 S | 12/2003 | Murphy |
| D483,420 S | 12/2003 | Delong et al. |
| D485,445 S | 1/2004 | De Maina |
| D488,194 S | 4/2004 | Fox et al. |
| 6,729,421 B1 | 5/2004 | Gluck |
| 6,749,039 B1 | 6/2004 | Uphaus |
| D493,391 S | 7/2004 | Gunter |
| 6,766,871 B2 | 7/2004 | Sawyer |
| D498,709 S | 11/2004 | Sramek |
| D500,707 S | 1/2005 | Lu |
| D503,658 S | 4/2005 | Lu |
| D512,467 S | 12/2005 | Hadley et al. |
| D513,483 S | 1/2006 | Buhrman |
| 7,044,491 B2 | 5/2006 | Kettler et al. |
| 7,108,090 B2 | 9/2006 | Turner |
| 7,117,967 B2 | 10/2006 | Kidd |
| 7,188,853 B2 | 3/2007 | Yen |
| 7,198,322 B2 | 4/2007 | Savo |
| D557,911 S | 12/2007 | Herold, III et al. |

(56) References Cited

U.S. PATENT DOCUMENTS

| | | |
|---|---|---|
| D562,914 S | 2/2008 | Oveson et al. |
| D570,572 S | 6/2008 | Whiteside et al. |
| D574,297 S | 8/2008 | Carl |
| D575,675 S | 8/2008 | Williams et al. |
| D582,489 S | 12/2008 | Bandanjo |
| D582,992 S | 12/2008 | Alais |
| D587,176 S | 2/2009 | Yang et al. |
| 7,552,934 B2 | 6/2009 | Lee et al. |
| D601,640 S | 10/2009 | McIlvain et al. |
| D608,250 S | 1/2010 | Van De |
| D611,106 S | 3/2010 | Van Beek |
| 7,712,558 B2 | 5/2010 | Helson et al. |
| D619,519 S | 7/2010 | Granata |
| D619,943 S | 7/2010 | Granata |
| 7,779,850 B2 | 8/2010 | Caldwell |
| D622,986 S | 9/2010 | Kubryk |
| D626,038 S | 10/2010 | Li |
| 7,823,675 B2 | 11/2010 | Kermani |
| D637,116 S | 5/2011 | Kettler |
| D637,660 S | 5/2011 | Markowitz |
| D644,580 S | 9/2011 | Markowitz et al. |
| D646,086 S | 10/2011 | Hickman et al. |
| 8,091,658 B2 * | 1/2012 | Peng .............. B62D 61/04 180/21 |
| 8,262,117 B2 | 9/2012 | Knopf et al. |
| 8,356,686 B2 | 1/2013 | Kermani |
| 8,365,850 B2 | 2/2013 | Gal et al. |
| D678,130 S | 3/2013 | Webster |
| D682,739 S | 5/2013 | Patterson et al. |
| D682,746 S | 5/2013 | Doherty et al. |
| D690,147 S | 9/2013 | Meyer |
| D692,505 S | 10/2013 | Jiang |
| D692,506 S | 10/2013 | Jiang |
| D693,415 S | 11/2013 | Doherty et al. |
| 8,627,910 B1 | 1/2014 | Carque |
| D705,128 S | 5/2014 | Patterson et al. |
| 8,757,644 B2 | 6/2014 | Satou |
| 8,801,005 B1 | 8/2014 | Flickner et al. |
| 8,820,460 B2 * | 9/2014 | Chen .............. B62K 5/027 180/210 |
| 8,840,131 B1 * | 9/2014 | Calley ............ B62D 61/065 180/210 |
| 8,875,831 B2 | 11/2014 | Kermani |
| 8,931,583 B2 * | 1/2015 | Tuckowski .......... A61G 5/043 180/65.1 |
| D731,222 S | 6/2015 | Bosman |
| 9,102,375 B2 | 8/2015 | Kermani |
| D739,318 S | 9/2015 | Rancan et al. |
| 9,139,248 B2 | 9/2015 | Xiao |
| D761,700 S | 7/2016 | Kermani |
| D766,780 S | 9/2016 | Fusco |
| D771,196 S | 11/2016 | Chen |
| 9,499,220 B2 | 11/2016 | Kermani |
| D773,359 S | 12/2016 | Okuyama et al. |
| D774,602 S | 12/2016 | Desberg |
| D774,981 S | 12/2016 | Chen |
| D775,282 S | 12/2016 | Williams et al. |
| D776,016 S | 1/2017 | Androski et al. |
| D776,204 S | 1/2017 | Van Der Berg |
| 9,557,740 B2 * | 1/2017 | Crawley ............ B25J 11/008 |
| D778,369 S | 2/2017 | Douma et al. |
| D783,726 S | 4/2017 | Williams et al. |
| D787,379 S | 5/2017 | Kermani |
| D787,610 S | 5/2017 | Desberg |
| D789,262 S | 6/2017 | Chen |
| D792,811 S | 7/2017 | Kermani et al. |
| D793,480 S | 8/2017 | Chen |
| D793,481 S | 8/2017 | Kermani et al. |
| D793,912 S | 8/2017 | Kermani |
| D801,242 S | 10/2017 | Kim |
| D807,438 S | 1/2018 | Desberg |
| D809,982 S | 2/2018 | Hosozawa |
| D813,314 S | 3/2018 | Montagne |
| D816,001 S | 4/2018 | Kim |
| D820,178 S | 6/2018 | Kim |
| D820,733 S | 6/2018 | Chen |
| D827,522 S | 9/2018 | Villamizar et al. |
| D830,469 S | 10/2018 | Kermani et al. |
| D830,470 S | 10/2018 | Chen |
| 10,245,194 B2 | 4/2019 | Kermani |
| 10,266,197 B2 | 4/2019 | Desberg |
| D848,166 S | 5/2019 | Braun |
| D850,328 S | 6/2019 | Allais |
| D852,892 S | 7/2019 | Chen |
| D852,893 S | 7/2019 | Kermani et al. |
| D854,457 S | 7/2019 | Kermani |
| D854,458 S | 7/2019 | Kermani |
| D855,339 S | 8/2019 | Ochs |
| 10,434,860 B2 | 10/2019 | Chen et al. |
| D872,657 S | 1/2020 | Li |
| 10,543,776 B2 | 1/2020 | Matsushima |
| D874,986 S | 2/2020 | Chen |
| D890,854 S | 7/2020 | Kermani et al. |
| D890,855 S | 7/2020 | Chen |
| 10,822,014 B2 | 11/2020 | Boittiaux et al. |
| 10,843,720 B2 | 11/2020 | Kwon et al. |
| D913,165 S | 3/2021 | Kermani |
| D913,878 S | 3/2021 | Kermani |
| 11,110,016 B2 | 9/2021 | Kermani |
| D940,794 S | 1/2022 | Chen |
| D949,749 S | 4/2022 | Chen |
| D953,938 S | 6/2022 | Kermani |
| D953,939 S | 6/2022 | Kermani |
| D957,534 S | 7/2022 | Kermani et al. |
| D988,420 S | 6/2023 | Chen |
| D993,092 S | 7/2023 | Kermani |
| 2001/0014569 A1 | 8/2001 | Baker |
| 2002/0011374 A1 | 1/2002 | Brister |
| 2002/0175027 A1 | 11/2002 | Usherovich |
| 2003/0102657 A1 | 6/2003 | Kuo |
| 2004/0035627 A1 | 2/2004 | Richey et al. |
| 2004/0040769 A1 | 3/2004 | Richey et al. |
| 2004/0183274 A1 | 9/2004 | Schipper |
| 2004/0199311 A1 | 10/2004 | Aguilar et al. |
| 2005/0103554 A1 | 5/2005 | Meglioli |
| 2005/0173180 A1 | 8/2005 | Hypes et al. |
| 2005/0236194 A1 | 10/2005 | Kidd et al. |
| 2007/0045022 A1 | 3/2007 | Greig et al. |
| 2007/0151777 A1 | 7/2007 | Peng |
| 2008/0029985 A1 | 2/2008 | Chen |
| 2008/0122209 A1 | 5/2008 | Jayasuriya |
| 2008/0196951 A1 | 8/2008 | Gal et al. |
| 2009/0007721 A1 | 1/2009 | Cortina et al. |
| 2009/0065272 A1 | 3/2009 | Martin et al. |
| 2010/0032223 A1 | 2/2010 | Kermani |
| 2011/0307133 A1 | 12/2011 | Brandon |
| 2012/0133111 A1 | 5/2012 | Schmutzer et al. |
| 2013/0256048 A1 | 10/2013 | Chen et al. |
| 2015/0328994 A1 | 5/2015 | Chen et al. |
| 2016/0059896 A1 | 3/2016 | Gergaud |
| 2016/0214557 A1 | 7/2016 | Villa |
| 2017/0156953 A1 | 6/2017 | Kermani |
| 2018/0029458 A1 | 2/2018 | Chen et al. |
| 2018/0273101 A1 | 9/2018 | Martin |
| 2020/0022856 A1 | 1/2020 | Kermani |
| 2020/0062100 A1 | 2/2020 | Chen et al. |
| 2022/0226175 A1 | 7/2022 | Kermani |
| 2022/0362077 A1 | 11/2022 | Kermani |

FOREIGN PATENT DOCUMENTS

| | | |
|---|---|---|
| CN | 1522916 A | 8/2004 |
| CN | 1569548 A | 1/2005 |
| CN | 2936826 | 8/2007 |
| CN | 200974447 Y | 11/2007 |
| CN | 200977859 | 11/2007 |
| CN | 201009762 Y | 1/2008 |
| CN | 203186508 U | 9/2013 |
| CN | 203427959 U | 2/2014 |
| CN | 203864416 U | 10/2014 |
| CN | 203864660 U | 10/2014 |
| CN | 204527453 U | 8/2015 |
| CN | 105083006 A | 11/2015 |
| CN | 205087107 U | 3/2016 |

(56) References Cited

FOREIGN PATENT DOCUMENTS

| CN | 105947015 A | | 9/2016 | |
|---|---|---|---|---|
| CN | 206012763 U | | 3/2017 | |
| CN | 109843708 A | | 6/2019 | |
| DE | 102010052909 A1 | | 6/2012 | |
| EP | 0529188 A1 | | 3/1993 | |
| EP | 3496931 B1 | | 1/2022 | |
| FR | 859864 A | * | 12/1940 | ........... B62D 25/105 |
| GB | 1200504 A | | 7/1970 | |
| JP | 07-285345 A | | 10/1995 | |
| JP | 2000-127982 A | | 5/2000 | |
| JP | 2007-082817 A | | 4/2007 | |
| JP | 2007-153004 A | | 6/2007 | |
| JP | 2010-047206 A | | 3/2010 | |
| KR | 2016-0133191 A | | 11/2016 | |
| SU | 1174775 A1 | | 8/1985 | |
| WO | WO 2018/032730 | | 2/2018 | |
| WO | WO 2018/035060 A1 | | 2/2018 | |

OTHER PUBLICATIONS

OTL Electrokart, "Storm Series—Competition" Datasheet, Jun. 14, 2014, retrieved on Aug. 6, 2016, https://www.kart1.com/pdf/competition.pdf, in 3 pages.

International Written Opinion of International Patent Application No. PCT/CN2017/072086, dated May 19, 2017.

International Search Report and Written Opinion in corresponding International Patent Application No. PCT/US2017/046815, dated Nov. 7, 2017, in 8 pages.

International Preliminary Report on Patentability in corresponding International Patent Application No. PCT/CN2017/072086, issued Feb. 19, 2019.

International Preliminary Report on Patentability in corresponding International Patent Application No. PCT/US2017/046815, issued Feb. 19, 2019.

Extended European Search Report in Application No. 17841948.7, dated Mar. 11, 2020, in 11 pages.

Razor USA: "Crazy Cart", Jul. 21, 2016 (Jul. 21, 2016), Retrieved from the Internet: URL: https://www.razor.com/wp-content/uploads/2018/02/CrazyCartshift_MAN_US_160721-1.pdf [retrieved on Mar. 3, 2020].

Recreation Ltd. "Razor Crazy Cart Shift Ride Video", Youtube, Aug. 15, 2016 (Aug. 15, 2016), Retrieved from the Internet: URL: https://youtube.com/watch?v=KjrfsfSiMZ4 [retrieved on Apr. 10, 2020].

* cited by examiner

KART

CROSS REFERENCE

This application claims priority to International Application No. PCT/CN2017/072086, filed Jan. 22, 2017, which claims priority to Chinese Utility Model No. 201620882608.6, filed Aug. 15, 2016, the entirety of each of which is incorporated by reference herein.

BACKGROUND

Field

The present disclosure generally relates to mobility vehicles, such as karts.

Certain Related Art

Many types of mobility vehicles exist, such as roller skates, skateboards, scooters, bicycles, karts, etc. A user can ride such a vehicle to travel from place to place.

SUMMARY OF CERTAIN FEATURES

A need exists for new and/or improved designs, which may provide a new riding experience or unique functionality. The systems, methods and devices described herein have innovative aspects, no single one of which is indispensable or solely responsible for their desirable attributes.

Various karts are described in this disclosure. According to some embodiments, a ridable kart includes a kart body, a cover body, a steering assembly, a battery, and a controller. The kart body can include an installation slot. The slot can include an opening. The cover body can be rotatably connected with the kart body at one end of the opening of the installation slot. The steering assembly can be connected with the kart body. The steering assembly can include a front wheel and a steering wheel. The front wheel can include a hub motor arrangement integrated with the front wheel. The steering wheel can be connected to the front wheel. The steering wheel can allow a user to steer (e.g., turn) the kart. The battery can supply power to the hub motor. The controller can cause the battery to supply power to the hub motor. The battery and the controller can be secured within the installation slot.

In some embodiments, the kart includes a seat that can support the user during operation of the kart. In some embodiments, the kart body includes a base and a raised region. The seat can be connected with the raised region to support the user at an elevated position relative to the base. In some embodiments, the installation slot is positioned forward of the seat. In some embodiments, the installation slot is positioned between the steering assembly and the seat. In some embodiments, the cover body has a generally U-shape, and the cover body is rotatably connected to the end of the opening of the installation slot adjacent to the seat.

In some embodiments, the kart includes an installation rack connected with the kart body. The installation rack can include a power switch. The installation rack can be positioned between the installation slot and the steering assembly. In some embodiments, the kart includes a charging port connected to the battery.

In some embodiments, the kart body includes a protruding portion, and the steering assembly is connected with the kart body at the protruding portion. In some embodiments, the battery is secured to the installation slot by a clamping member. The clamping member can be positioned adjacent the battery and a fastener that can pass through the clamping member to secure the clamping member and the battery to the kart body. In some embodiments, the kart body is integrally formed by blow molding.

In some embodiments, the steering wheel includes a top cover comprising a fixture block, a bottom cover comprising a card slot, and a connection rack coupled with an inner side of the bottom cover. The fixture block can be clamped within the card slot to secure the top cover to the bottom cover.

In some embodiments, the steering wheel includes an insert positioned within an interior space between the top cover and the bottom cover. In some embodiments. the top cover includes a first material, the bottom cover includes the first material, and the insert includes a second material. In some embodiments, the first material includes plastic and the second material includes metal.

In some embodiments, the steering assembly includes a steering component connecting the steering wheel to the front wheel. The steering component can include a connecting rod and a fork. The connecting rod can be connected to the connection rack by a second fastener. The fork can be connected to the connecting rod and the front wheel.

In some embodiments, the fork includes a first set of prongs including a first interior space configured to receive an axle; and a second set of prongs including a second interior space configured to receive at least a portion of the hub motor. The first interior space can be narrower than the second interior space.

In some embodiments, the kart includes a pedal connected with the kart body to control a rotational speed of the front wheel. In some embodiments, the seat is configured to be positioned below the steering wheel. In some embodiments, the seat comprises a back portion and a base. The back portion can be generally aligned with a rear side of the kart body.

The foregoing summary is a high-level overview of certain features of the kart. The summary is illustrative only and is not intended to be limiting. Other aspects, features, and advantages of the kart will become apparent from the description below. No feature in this disclosure is essential or critical.

BRIEF DESCRIPTION OF THE DRAWINGS

The foregoing and other features of the present disclosure will become more fully apparent from the following description and appended claims, taken in conjunction with the accompanying drawings. Understanding that these drawings depict only illustrative embodiments in accordance with the disclosure and are not to be considered limiting of its scope, the disclosure will be described with additional specificity and detail through the use of the accompanying drawings.

DESCRIPTION OF CERTAIN EMBODIMENTS

Figure 1:
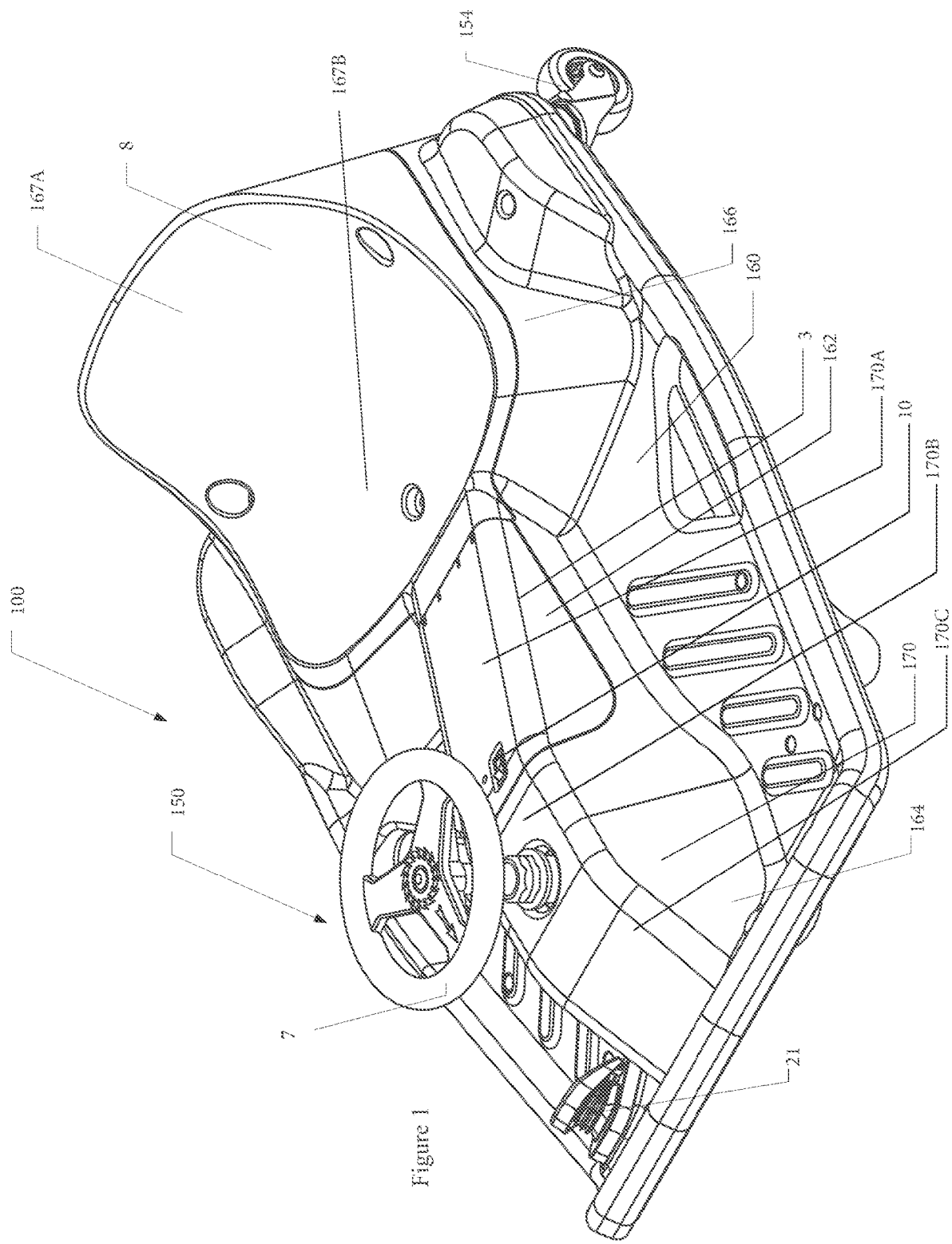
FIG. 1 illustrates a front, top, and side perspective view of an embodiment of a kart.
Figure 2:
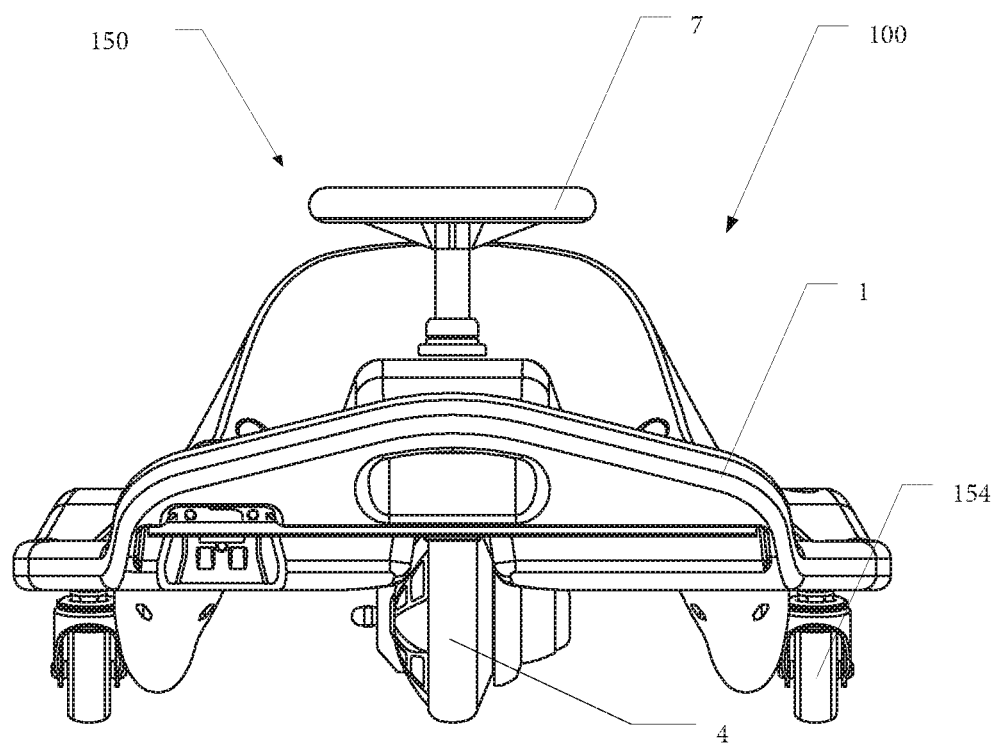
FIG. 2 illustrates a front view of the kart of FIG. 1.
Figure 3:
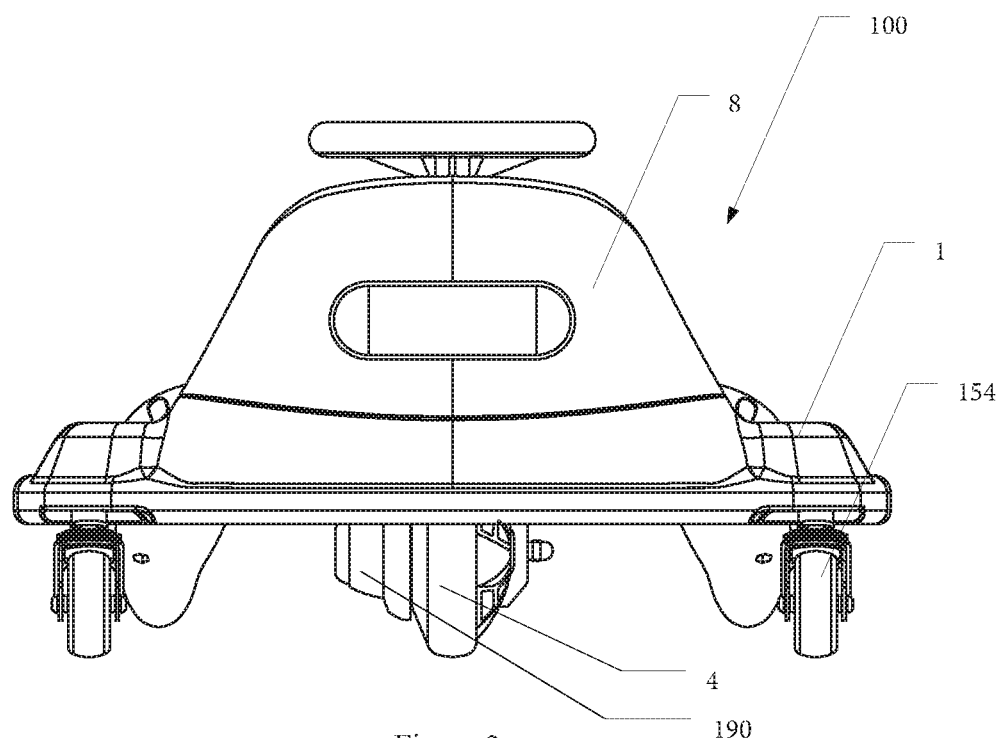
FIG. 3 illustrates a rear view of the kart of FIG. 1.

Embodiments of systems, components and methods (e.g., of assembly and manufacture) will now be described with reference to the accompanying figures, wherein like numerals refer to like or similar elements throughout. Although several embodiments, examples and illustrations are disclosed below, the inventions described herein extend beyond the specifically disclosed embodiments, examples and illustrations, and can include other uses and obvious modifications and equivalents thereof. Certain embodiments can comprise several novel features and no single feature is solely responsible for its desirable attributes or is essential to practicing the inventions herein described.

The terminology used in this disclosure should be interpreted by its plain and ordinary meaning, unless specifically specified otherwise. The terminology should not be interpreted in any limited or restrictive manner simply because it is being used in conjunction with a description of certain specific embodiments of the inventions. Throughout the following description, like numbers refer to like components.

Overview

Various embodiments of a riding kart are described below. The riding kart can be driven and/or turned as the kart is driven over a riding surface. In some embodiments, at least a portion of the kart (such as a kart body 1) includes various materials. The material of the kart, such as the kart body, can include plastic, among other materials. The plastic material can provide sufficient strength to support a user. In some embodiments, the plastic material can desirably reduce the weight of the kart body and/or the kart as a whole. In some embodiments, the reduction in weight can help to reduce a driving load. Some configurations can beneficially decrease the amount of power required to drive the kart and/or increase the battery life of the kart. Some configurations can reduce wear and tear on the kart, and/or increase the life-span of certain components, among other benefits. Some such configurations can help to reduce the amount of material required to form the kart.

In some embodiments, the kart and/or the kart body, among other portions of the kart can be made using various manufacturing processes. For example, in some embodiments, the kart body can be formed via a blow molding process. In some embodiments, the blow molding process can allow the kart body to be integrally formed as a single unit. In some embodiments, the kart body is constructed from several portions that are connected and/or otherwise attached. In some embodiments, the blow molding process allows for higher efficiency in forming the kart body.

FIGS. 1-15 illustrate an embodiment of a kart 100. The kart 100 can include a kart body 1, a steering assembly 150, and/or one or more wheels. In some embodiments, the kart 100 includes at least one front wheel 4 and at least one rear wheel 154. As will be described in more detail below, the at least one front wheel 4 and/or the at least one rear wheel 154 can be powered and/or steerable. In some embodiments, the at least one front wheel 4 and/or the at least one rear wheel 154 can be non-powered. While the illustrated embodiment shows a front wheel 4 being powered by, for example, a motor (e.g., a hub motor), in some embodiments, the at least one rear wheel 154 can be powered, the at least one rear wheel 154 can be non-powered, and/or the front wheel 4 can be non-powered.

Kart Body

Figure 10:
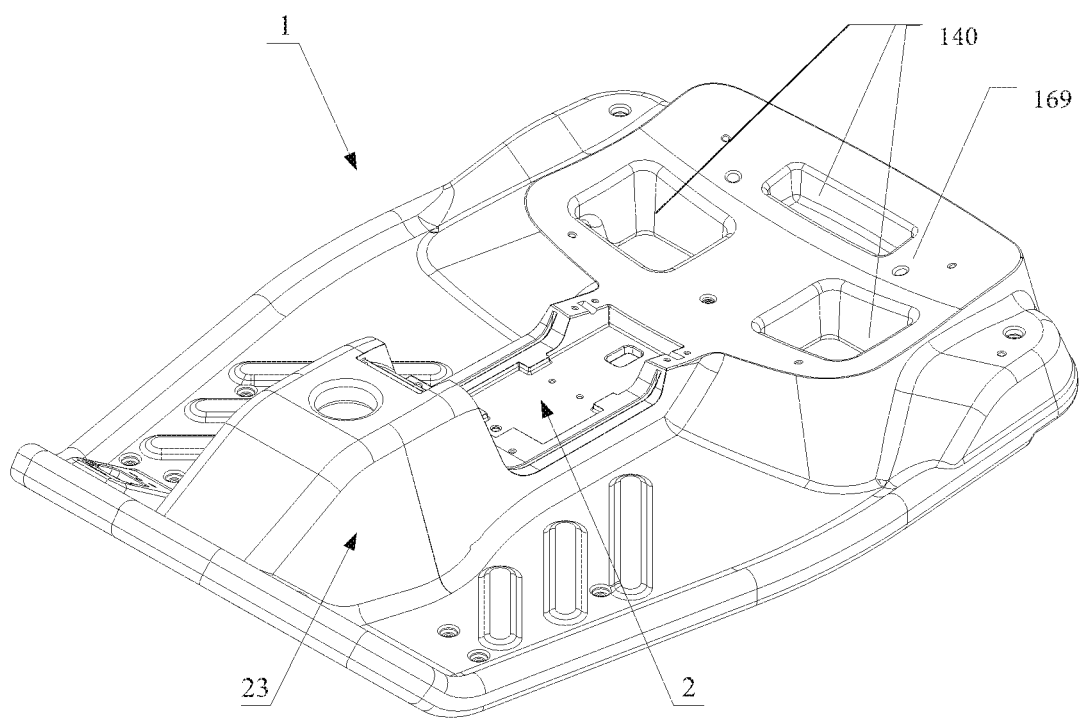
FIG. 10 illustrates a front, top, and side perspective view of a body of the kart of FIG. 1.
Figure 11:
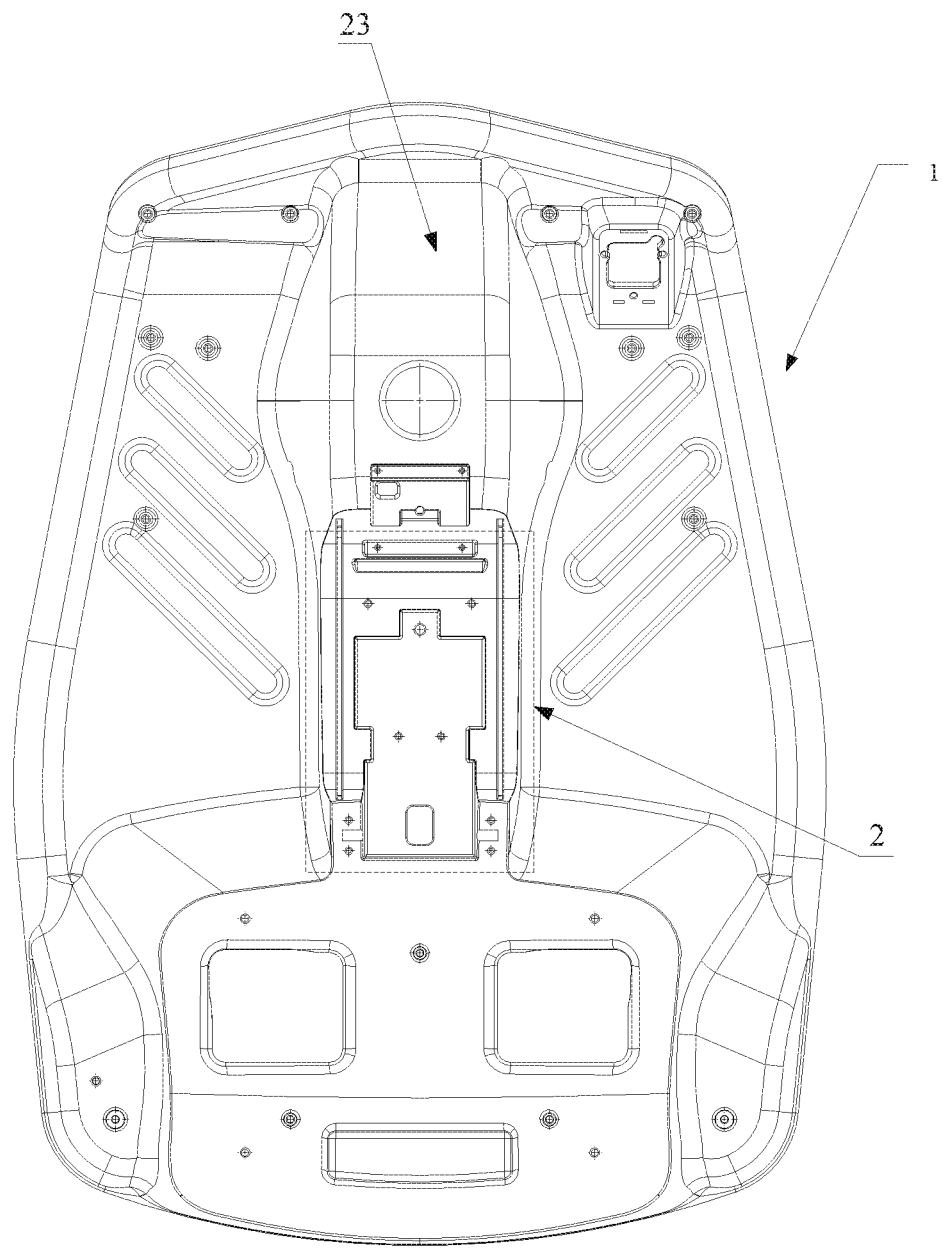
FIG. 11 illustrates a top view of the body of FIG. 10.

FIG. 1 shows an embodiment of the kart 100. FIGS. 10 and 11 show an embodiment of the kart body 1. As shown in FIG. 1, in some embodiments, the body 1 can include a base 168 and one or more raised regions. The body 1 can include a rearward region 160, an intermediate region 162, and a forward region 164. The rearward region 160 can include a raised region 166. The raised region 166 can be raised relative to a base 168 of the body 1. In some embodiments, the raised region 166 can include a flat portion 169 (see FIG. 10). The flat portion 169 can provide a platform to support a user.

In some embodiments, the raised region 166 extends laterally across at least a portion of the body 1. In some embodiments, the raised region 166 extends laterally across a width of the rearward region 160 of the body 1. In some embodiments, the raised region 166 includes side portions extending between the base 168 of the body 1 and the flat portion 169 of the raised region 166. In some embodiments, the side portions are angled inwardly and upwardly from the base 168 of the body 1 towards the flat portion 169. In some embodiments, the side portions extend approximately vertically from the base 168 towards the flat portion 169. In some embodiments, the side portions extend outwardly from the base 168 towards the flat portion 169. In some embodiments, the raised region 166 is configured to engage with a visibility feature, such as a flagpole. For example, the raised region 166 can include a recess that receives a bottom end of the flagpole. In certain implementations, the raised region 166 comprises a shoulder on one or both lateral sides of a seat 8.

In some embodiments, the forward region 164 includes a protruding portion 170. At least a portion of the protruding portion 170 can be elevated relative to the base 168 of the body 1. In some embodiments, the protruding portion 170 is elevated relative to the intermediate region 162 and/or the raised region 166.

In some embodiments, the protruding portion 170 has a generally trapezoidal shape. For example, the protruding portion 170 can have a rearward side 170A, a top side 170B, and a front side 170C. In some embodiments, at least a portion of the intermediate region 162 (such as a body cover 3 as described below), forms the rearward side 170A of the protruding portion 170. In some embodiments, the rearward side 170A extends between the intermediate region 162 and the top side 170B of the protruding portion 170 (e.g., upwardly from the intermediate region 162). In some embodiments, the top side 170B of the protruding portion 170 is elevated relative to a remainder of the body 1. In some embodiments, the top side 170B is relatively flat. In some embodiments, the front side 170C extends downwardly from the top side 170B. In some embodiments, the front side 170C extends downwardly from the top side 170B to a front region of the forward region 164. In some embodiments, the protruding portion 170 is narrower than the width of the base 168 of the body.

In some embodiments, the front region of the forward region 164 of the body 1 extends at an angle upwardly from the base 168 of the body 1. In certain configurations, the angled front region is aesthetically pleasing. In some embodiments, the angled front region enhances aerodynamics of the kart 100. The angled front region can help to allow a user to more easily steer the kart 100.

Seat

In some embodiments, the kart body 1 includes a seat 8. The seat 8 can support a user. In some embodiments, the seat 8 can support the user in a seated position. The seat 8 can be positioned so that the user is readily able to operate the kart 100 (for example, by steering the kart 100).

Figure 4:
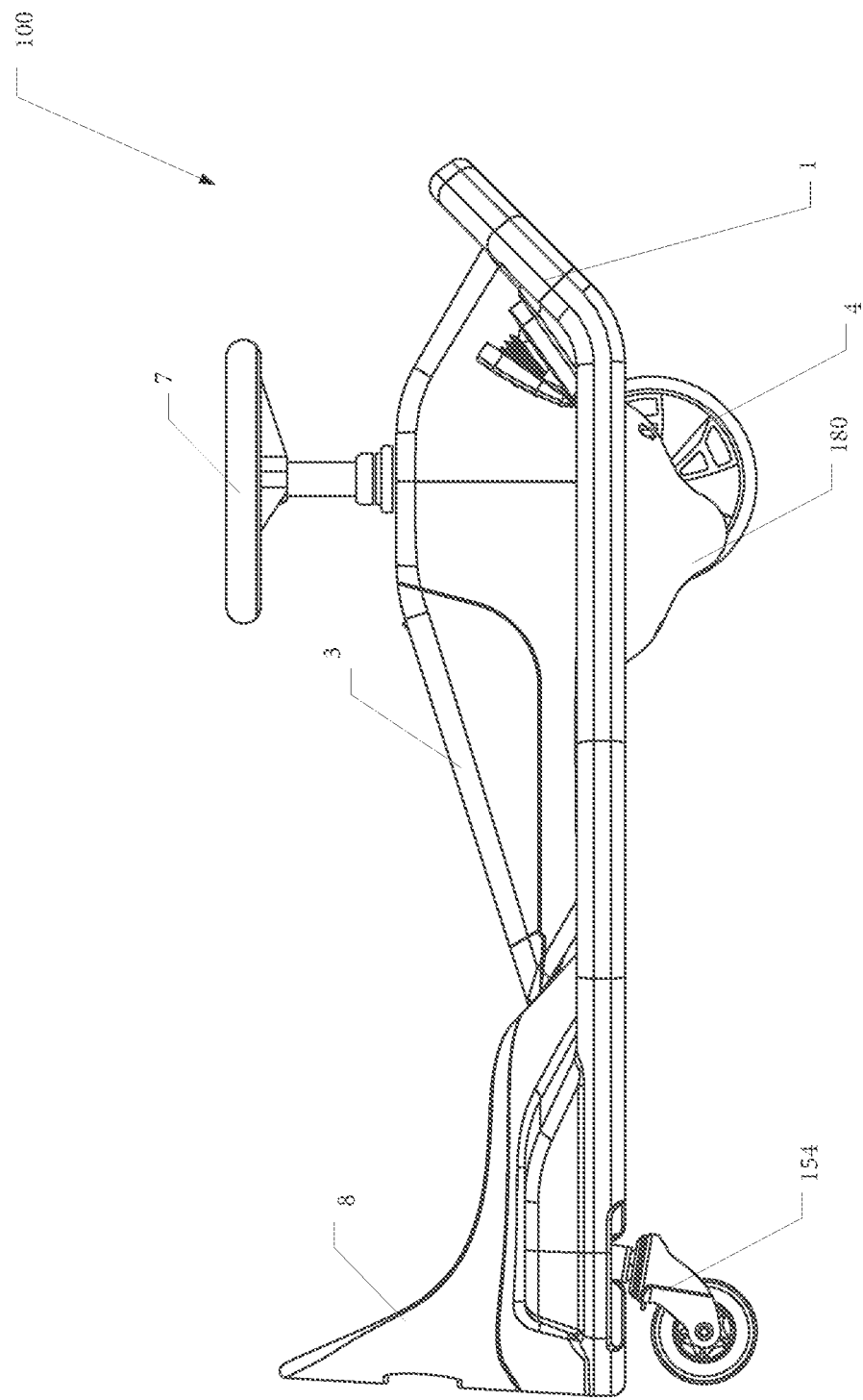
FIG. 4 illustrates a side view of the kart of FIG. 1.
Figure 5:
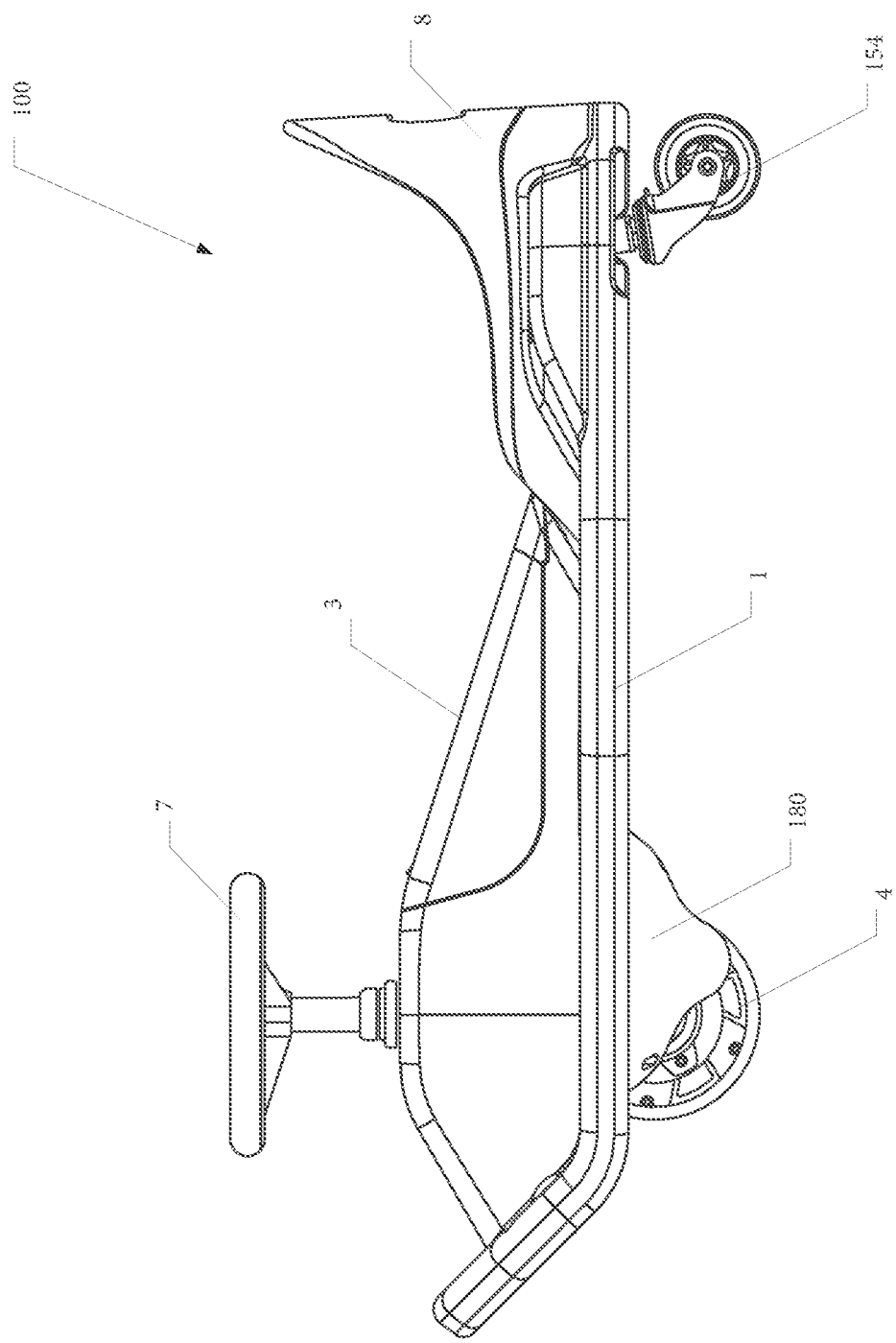
FIG. 5 illustrates another side view of the kart of FIG. 1.
Figure 6:
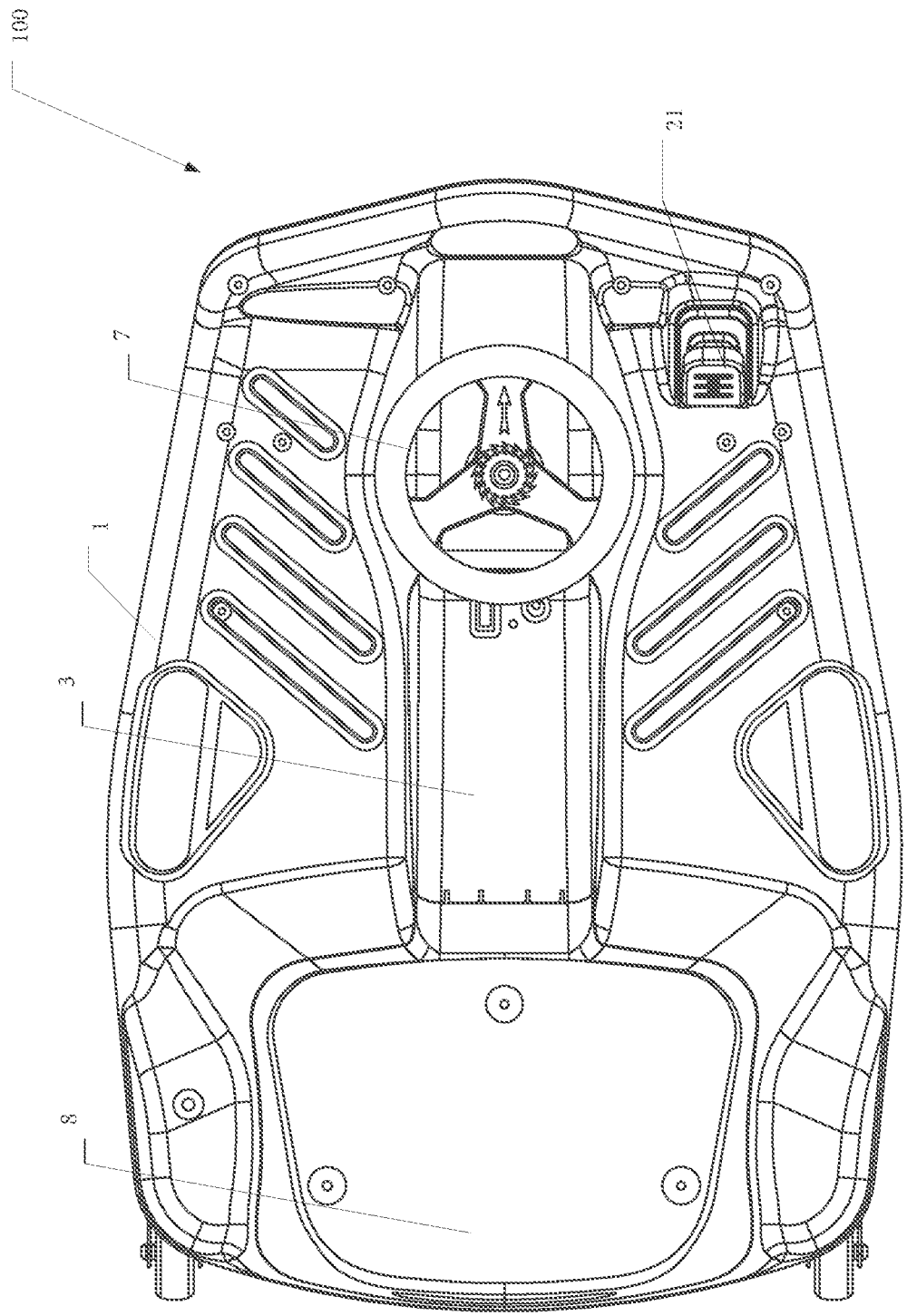
FIG. 6 illustrates a top view of the kart of FIG. 1.
Figure 7:
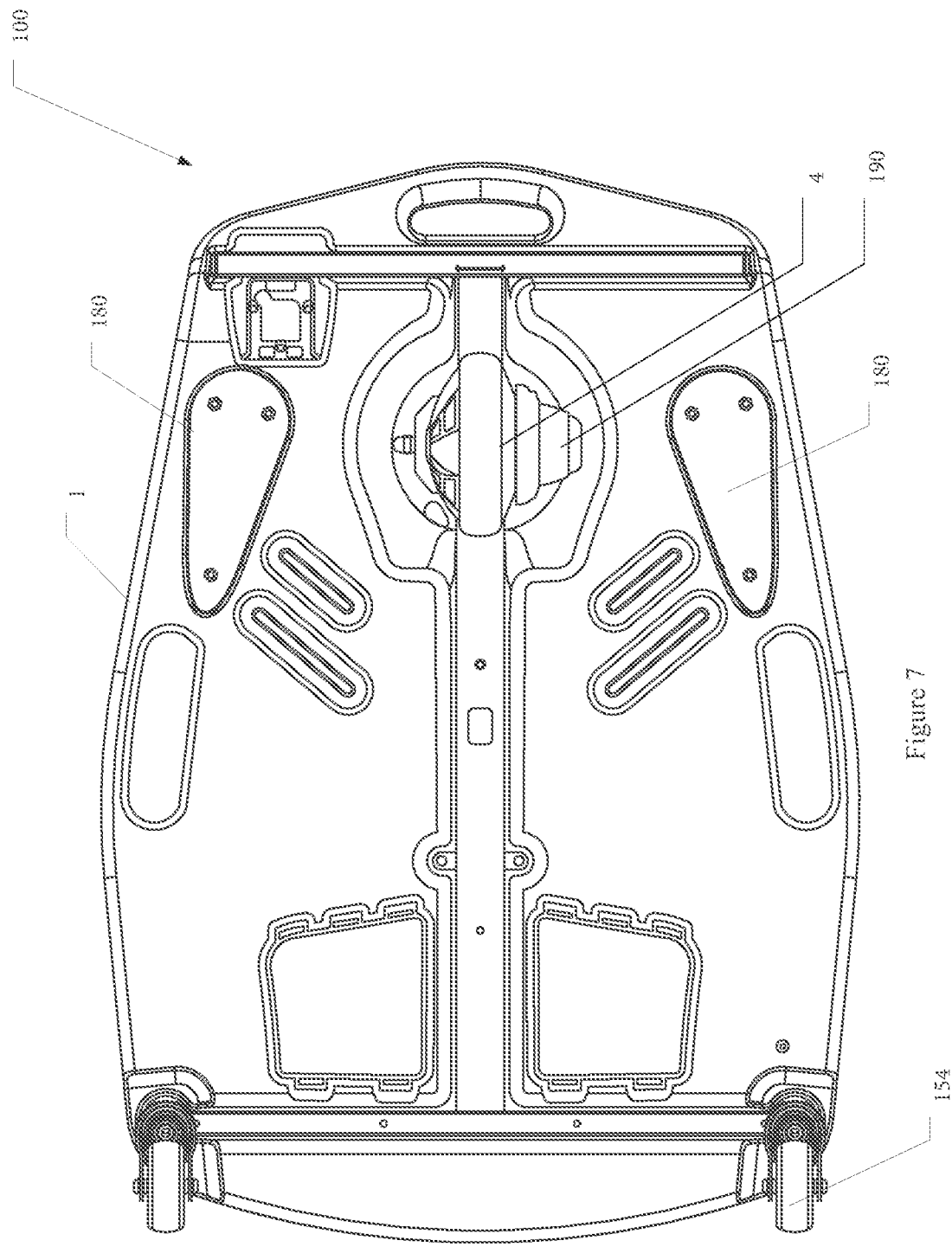
FIG. 7 illustrates a bottom view of the kart of FIG. 1.

In some embodiments, the seat 8 is fixed to the kart body 1. In some embodiments, the seat 8 is removably attached to the kart body 1. In some embodiments, the seat 8 is attached to the body 1 as low as possible and/or as close to a riding surface as possible. Positioning the seat 8 low relative to the riding surface can help to limit rolling to the side and/or help to inhibit the kart 100 from toppling on its side as the kart 100 is turned and/or tilted. As shown in FIGS. 4 and 5, in some implementations, the rear of the seat 8 comprises the rearmost end of the kart 100.

In some embodiments, at least a portion of the seat 8 is connected to the raised region 166 of the body 1. In some embodiment, the raised region 166 is elevated relative to the base of the body 1. In some configurations, the raised region 166 can provide additional space to accommodate various sized users. Some embodiments can allow the user to more easily steer the kart 100 in use.

The seat 8 can include a rear portion 167A and a base 167B. In some embodiments, the rear portion 167A can support the user's back. In some embodiments, the base 167A can support a body of the user. In some embodiments, the base is connected to the body 1. In some embodiments, all or a portion of the seat 8 is positioned lower than a steering wheel 7. For example, in some embodiments, the base 167B and/or the rear portion 167A of the seat 8 is positioned lower than the steering wheel 7 of the steering assembly 150. In some embodiments, the seat base 167B can be positioned below the top side 170B. In some embodiments, at least a portion of the seat base 167B can be positioned below at least a portion of the pedal 21. In some embodiments, at least a bottom of the seat base 167B can be positioned below a top edge of the pedal 21. In some embodiments, at least a portion of the rear portion 167A is positioned below the top side 170B and at least a portion of the rear portion 167A is positioned above the top side 170B. In some embodiments, the base 167B is approximately aligned with the region where the front side 170C meets the base 160. In some embodiments, the base 167B is positioned higher than the region where the front side 170C meets the base 160. In some embodiments, the base 167B is positioned lower than the region where the front side 170C meets the base 160. In some embodiments, a top side of the rear portion 167A is positioned above the opening of the top side 170B and/or the base 167B is positioned below the opening of the top side 170B. In some embodiments, the top side of the rear portion 167A is positioned approximately aligned with a lower side of the connection rack 22. In some embodiments, the rear portion 167A is positioned higher than the lower side of the connection rack 22. In some embodiments, the seat 8 is positioned above the motor. In some embodiments, at least a portion of the seat 8 is positioned above a top side of at least one of the batteries 5. In some embodiments, the base 167B is positioned below the controller 6. In some embodiments, the base 167B is positioned approximately aligned with the controller 6. In some embodiments, at least a portion of the seat 8 is positioned below the installation rack 9 and at least a portion of the seat 8 is positioned above the installation rack 9. In some embodiments the seat base 167B includes a lateral middle portion between opposite sides of the seat 8. In some embodiments, the seat base 167B includes lateral sides of the seat 8. In some embodiments, the seat base 167B includes the lateral sides of the seat 8 and the lateral middle portion of the seat 8. In some variants, the seat base 167B is located at and/or on the lateral midpoint of the seat 8. In certain embodiments, the seat base 167B is located at and/or on the longitudinal (front-to-back) midpoint of the seat 8.

In some embodiments, the rear portion of the seat 8 is generally aligned with a rear side of the body 1. In some embodiments, the rear portion of the seat 8 is generally aligned with a rear side of the raised region 166 of the body 1. In some embodiments, the seat 8 and/or the raised region 166 is positioned inwardly from the rear end of the body 1. For example, the seat 8 and/or the raised region 166 can be positioned spaced inwardly from the rear end of the body 1 by a lip.

Figure 15:
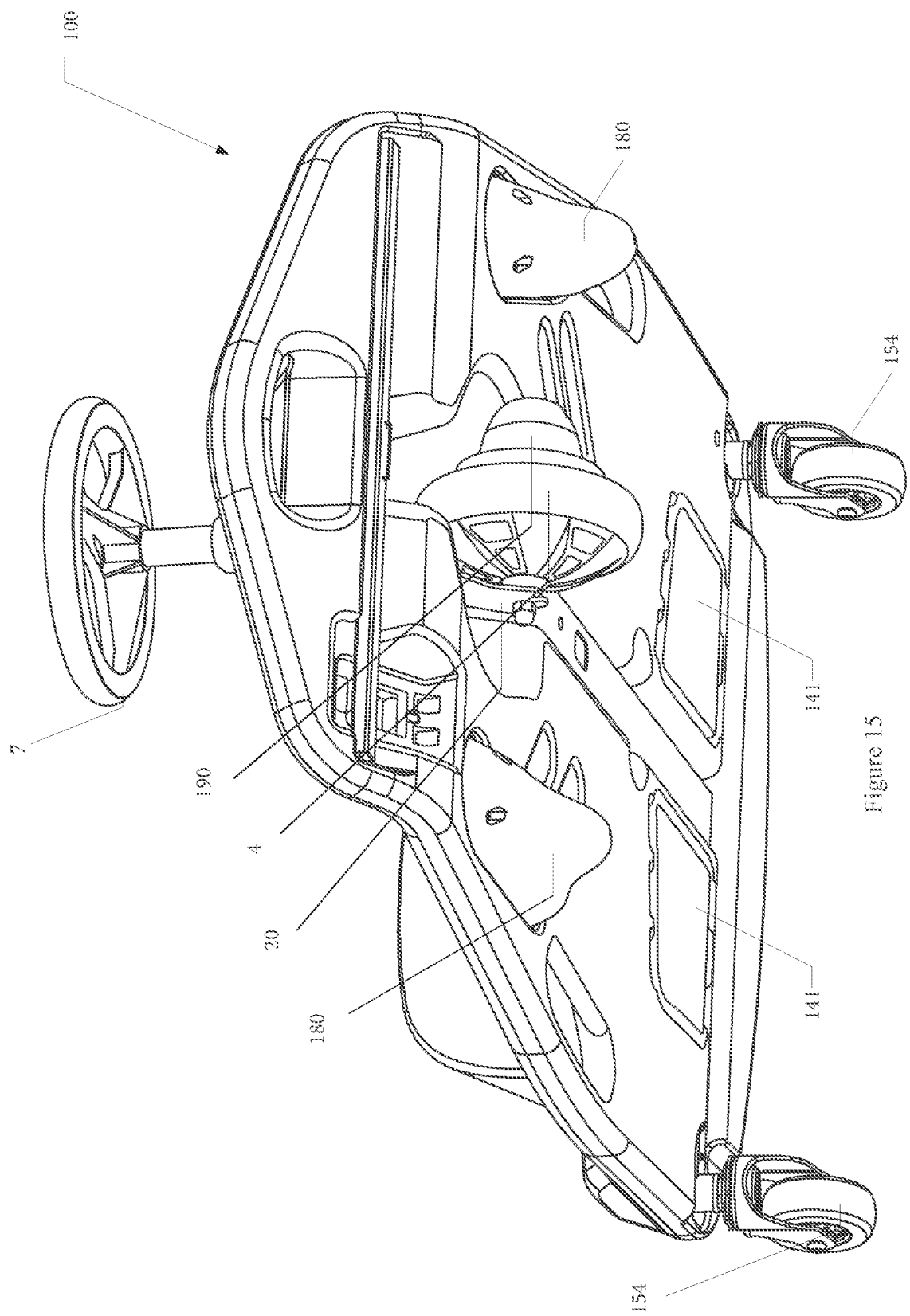
FIG. 15 illustrates a front, bottom, and side perspective view of the kart of FIG. 1.

As shown in FIGS. 10 and 15, in some embodiments, the kart body 1 can include one or more cavities, such as one or more storage compartments 140, 141. In some embodiments, the kart body 1 includes at least one, two, three, four, five, or six or more storage compartments 140, 141. In some embodiments, the storage compartments 140, 141 is the same size and/or a different size. In some embodiments, the storage compartments 140, 141 are positioned in the same orientation and/or a different orientation. In some embodiments, the at least one of the storage compartments 141 are aligned (e.g., approximately vertically aligned) with at least one of the storage compartments 140. In some variants, the compartment 140 connects with the compartment 141. In some embodiments, the storage compartment 141 forms a portion of the storage compartment 140, such as a bottom portion that can be visible through a bottom of the kart body 1. In some embodiments, the storage compartments 140, 141 are located in the rearward region of the kart 100. For example, the storage compartments 140, 141 can be located in the rear half of the kart 100. In some implementations, the storage compartments 140, 141 are rearward of the seat 8, a battery 5, and/or the front wheel 4. As illustrated in FIGS. 10 and 15, in certain implementations, the cavities are substantially symmetrically located and/or shaped on either side of a longitudinal centerline of the kart 100. In some embodiments, the storage compartments 140, 141 are located in the intermediate region and/or the forward region of the kart body 1. The compartments can be forward of the rear wheels 154. The compartments 140, 141 can be positioned partially or completely beneath the seat 8. In some embodiments, one or more of the compartments 140, 141 include a cover, such as a lid. The cover can be removable. In some embodiments, one or more of the storage compartments 140, 141 are accessible via the bottom of the kart 100. In some embodiments, one or more of the compartments 140, 141 is accessible by moving (e.g., pivoting) or removing the seat 8.

In some embodiments, the storage compartments 140,141 form a hollow recess in the kart body 1. In some embodiments, the storage compartments 140, 141 can be at least partially filled. In some embodiments, the storage compartments can include, or be configured to receive, a weight or other material to increase the overall weight of the kart 100 and/or to adjust the weight distribution of the kart 100. In some embodiments, removal of the added weight can decrease the overall weight of the kart 100. Some configurations having added weight can alter and/or enhance the user's riding performance. For example, in some configurations, the added or reduced weight helps to stabilize the kart 100 and/or distribute the weight of the user. In some embodiments, the storage compartments 140, 141 are accessible to add or reduce the additional weight. In some embodiments, the added weight stored in the storage compartments can be changed depending on the weight and/or size of the user. In some configurations, the added and/or reduced weight, and/or the positioning of the weight and/or storage compartments 140, 141 can allow the kart 100 to be turned more quickly and/or spin faster. For example, in some configurations, the added or reduced weight (and/or the positioning of the weight) can allow the kart 100 to be spun in 360 degrees at a faster rate. In some embodiments, the added or reduced weight stored in the storage compartments 140, 141 can allow the kart 100 to be steered more easily. In some embodiments, the added or reduced weight stored in the storage compartments can allow the kart 100 to speed up more quickly and/or more slowly.

Installation Slot

In some embodiments, the body 1 includes the intermediate region 162. The intermediate region 162 can be positioned forward of the raised region 166. In some embodiments, the intermediate region 162 extends from a front side of the seat 8 and/or the raised region 166. In some embodiments, the intermediate region 162 transitions smoothly between the front side of the seat 8 and/or the raised region 166. In some embodiments, a rear side of the intermediate region 162 is positioned below, above, and/or at the same elevation of the raised region 166. In some embodiments, the intermediate region 162 is angled upwardly away from the raised region 166. In some embodiments, the intermediate region 162 is angled upwardly away towards a front of the kart 100. In some embodiments, a maximum width of the intermediate region 162 is narrower than a maximum width of the raised region 166. In some embodiments, the intermediate region 162 is positioned centered along a longitudinal axis of the kart 100.

Figure 8:
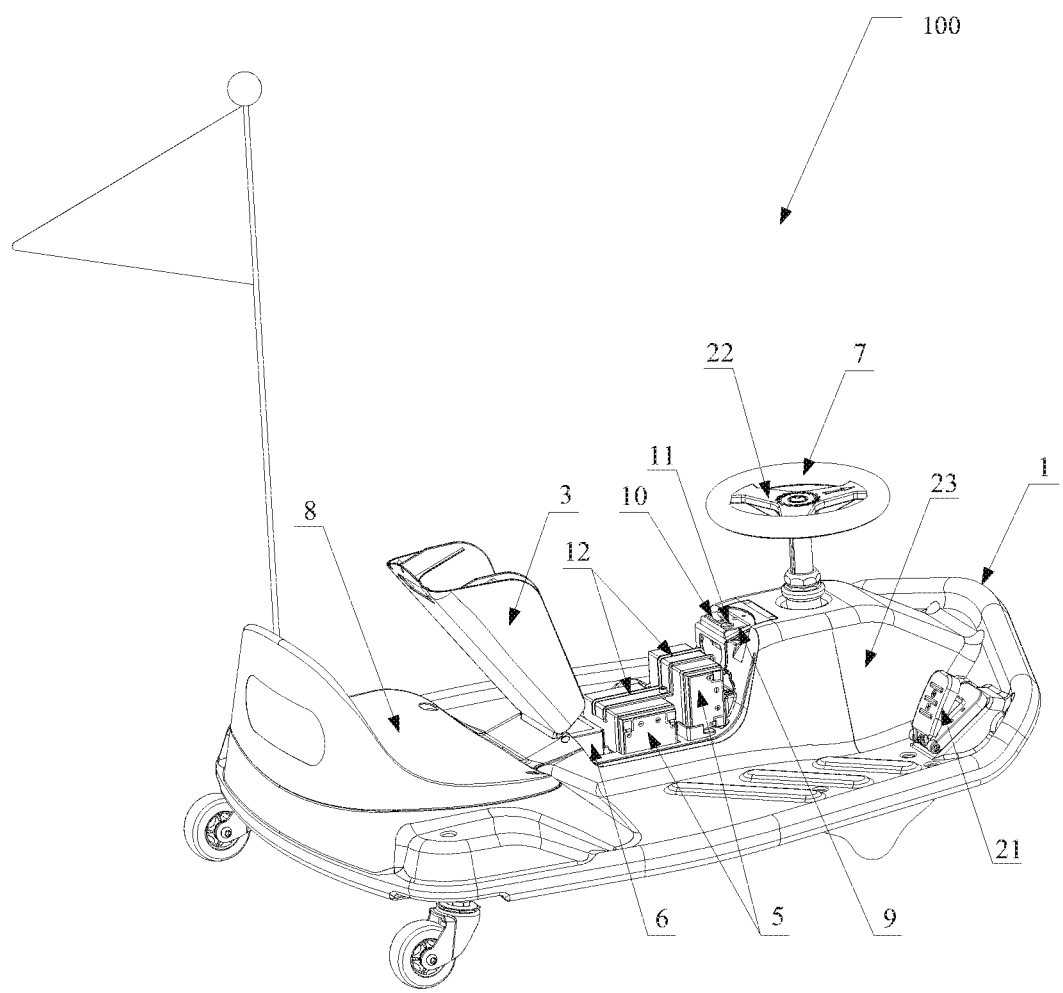
FIG. 8 illustrates a rear, top, and side perspective view of the kart of FIG. 1, showing an installation slot in an opened position and with a visibility flag.
Figure 9:
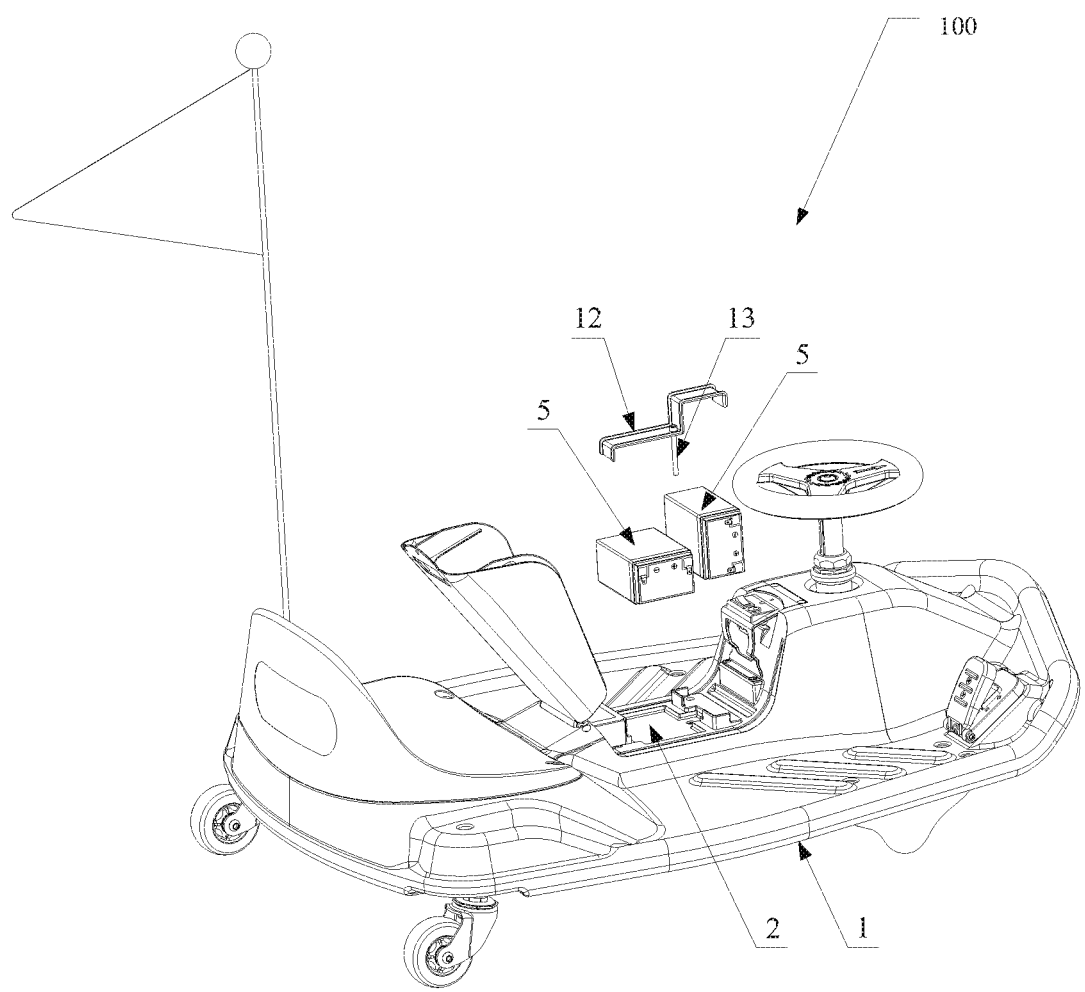
FIG. 9 illustrates a partial exploded view of the kart of FIG. 1, showing example locations of a battery and a controller with the installation slot in the opened position.

As shown in FIGS. 8 and 9, in some embodiments, the intermediate region 162 includes an installation slot 2. The installation slot 2 can include an opening. The installation slot 2 can be formed in the body 1. For example, the installation slot 2 can form a recess in the body 1. In some embodiments, the installation slot 2 can form a compartment in the body 1. The installation slot 2 can extend inwardly from an upper surface of the intermediate region 162. As described in more detail below, the installation slot 2 can house a power source (e.g., a battery 5), a controller 6, and/or an installation rack 9.

In some embodiments, the intermediate region 162 of the body 1 can include a cover body 3. The cover body 3 can at least partially cover the opening of the installation slot 2. In some embodiments, the cover body 3 can enclose the battery 5, the controller 6, and/or the installation rack 9, among other components, within the installation slot 2.

The cover body 3 can be connected to the intermediate region 162. In some embodiments, the cover body 1 is pivotably connected to the intermediate region 162 at one end of the installation slot 2. In some embodiments, the cover body 1 is pivotably connected to the intermediate region 162 at a rear end of the installation slot 2. In some embodiments, the cover body 1 is pivotably connected to the intermediate region 162 at a front and/or side end of the installation slot 2.

In some embodiments, the cover body 3 is connected to the body 1 by a rotatable fastener, such as a hinge or other fastener. The hinge can allow the cover body 3 to easily be opened and/or closed. The cover body 3 and/or rotatable fastener can allow the installation slot 2 to be easily accessed. Certain configurations can allow the battery 5 or the controller 6, among other components housed within the installation slot 2 to be removed, replaced, and/or placed within the installation slot 2. In certain configurations, the cover body 3 protects the battery 5, the controller 6, or other internal components housed within the installation slot 2 when the cover body 3 is at least partially and/or fully closed.

In some embodiments, the rotatable fastener is positioned at the rear side of the installation slot 2. As shown, a first distance between a front end of the installation slot 2 and the steering assembly 150 can be positioned closer than a second distance between a rear end of the installation slot 2 and the seat 8. The first distance being smaller than the second distance can provide a greater area for the cover body 3 to rotate between the installation slot 2 and the seat 8. In some embodiments, the cover body 3 is positioned such that the cover body 3 rotates against the seat 8 with a larger angle when opened. In some such configurations, the larger rotation angle can allow for the internal contents of the installation slot 2 to be easily removed, replaced, and/or added. This can be more convenient to the user, can help the user more easily maintain the kart 100, and/or can also allow the user to access the installation slot 2 and avoid contacting the steering assembly 150.

The cover body 3 can form various shapes and can be sized to cover at least a portion of the installation slot 2. In some embodiments, the cover body 3 is generally U-shaped. For example, the cover body 3 can include a top wall and at least two side walls that at least partially surround the installation slot 2. In some embodiments, the side walls extend from the top wall of the cover body 3 to form the U-shape. Certain configurations of the cover body 3, such as the U-shape, can provide an integral structure with the body 1. In some configurations, the cover body 3 can form a generally smooth surface with the body 1 when closed. In certain configurations, the shape of the cover body 3 is aesthetically pleasing.

FIG. 8 illustrates a perspective view of the kart 100 showing the installation slot 2 in an opened position. FIG. 9 illustrates a partial exploded view of the kart 100 showing the battery 5 and the controller 6, with the installation slot 2 in the opened position. As mentioned above, the installation slot 2 can house at least a battery 5 and/or the controller 6. The battery 5 and/or the controller 6 can be fixed to the body 1 within the installation slot 2 by various means. For example, the battery 5 and/or the controller 6 can be fastened to the installation slot 2 by clamping. Clamping the battery 5 and/or the controller 6 to the installation slot 2 can allow the battery 5 and/or the controller 6 to be more easily assembled or disassembled. Clamping the battery 5 and/or the controller 6 to the installation slot 2 can secure the battery 5 and/or the controller 6 to the body 1.

In some embodiments, the battery 5 and/or the controller 6 are clamped to the body 1 by a clamping member 12. The clamping member 12 can be shaped to conform to a side of the battery 5 and/or the controller 6. In some embodiments, the clamping member 12 extends over at least a portion of a top and/or side of the battery 5 and/or the controller 6. The clamping member 12 can extend over at least a central portion of the battery 5 and/or the controller 6. The clamping member 12 can be secured to the body 1 by a fastener, such as a bolt 13, among other fasteners. The fastener can removably secure the clamping member 12 to the body 1 and securely fasten the battery 5 and/or the controller 6 within the installation slot 2. In certain configurations, the clamping member 12 compresses or compacts the battery 5 and/or the controller 6 between the clamping member 12 and the body 1. The bolt 13 can adjust (e.g., increase and/or decrease) an amount of compression force applied to the battery 5 and/or the controller 6 to secure and/or release the battery 5 and/or the controller 6.

In some embodiments, the kart 100 includes one or more batteries 5. In some embodiments, the kart 100 includes one, two, three, four, five, or six or more batteries 5. In some embodiments, the one or more batteries 5 can supply power to the motor at the same time and/or at different times (sequentially after each battery 5 is drained) In some embodiments, the kart 100 includes batteries 5 having various shapes, sizes, and/or orientations (e.g., one battery rotated 90 degrees relative to another battery). Having multiple batteries 5 can extend the length of time the kart 100 can be operated. In some embodiments, positioning the batteries 5 in various orientations (e.g., a first orientation and a second orientation that is different from the first orientation) can allow for at least two batteries 5 to be used. Some configurations can allow the kart 100 to have at least two batteries 5, while maintaining consistency between the batteries 5 (e.g., the same battery type). Some configurations can allow the kart 100 to have at least two batteries 5, while maintaining the generally continuous slope of the rear side 170A. The bolt 13 can be positioned between the batteries 5, as shown, in the front-to-back direction. Some embodiments include multiple instances of the same battery. The instances of the battery can be positioned in the same or different configurations. For example, in some variants, a first instance of the battery is positioned in a horizontal configuration and a second instance of the battery is positioned in a vertical configuration. In some implementations, a second instance of the battery is rotated (e.g., greater than or equal to about: 90°, 180°, or otherwise) relative to a first instance of the battery.

As mentioned above, the battery 5 can be positioned within the installation slot 2. The battery 5 can supply power (e.g., electrical energy) to the motor to drive the kart 100. In some embodiments, the battery 5 can be positioned rearward, forward, below, and/or above the seat 8. In some embodiments, the battery 5 can be positioned rearward, forward, below, and/or above the protruding portion 170. Positioning the battery 5 within the installation slot 2 can allow the battery 5 to be positioned closer to the motor. Because the battery 5 may be positioned close to the motor, less wiring may be required to electrically connect the battery 5 with the motor. This can help to save material and reduce the complexity of the wiring. Several configurations of the battery 5 may decrease the rate of electrical problems, such as short circuits and/or open circuits.

The kart 100 can include the controller 6, such as a processor and memory. In some embodiments, the controller 6 communicates with one or more components through a wired connection or wireless connection, such as via wi-fi, Bluetooth®, etc. The controller 6 can control aspects of certain components of the kart 100. The controller 6 can be used for controlling the kart 100 via programming, for example, starting, braking, speeding up and slowing down etc. In some embodiments, the controller 6 can be positioned at various locations on and/or in the kart 100. As mentioned above, in some embodiments, the controller 6 can be positioned within the installation slot 2.

Pedal

In some embodiments, the kart 100 includes a motor control, such as a pedal 21. The pedal 21 can be connected to the body at the forward region 164 of the body 1. In some embodiments, the pedal 21 is mounted at least partially along the angled front side of the forward region 164 of the body 1. This can allow the user to more easily access the pedal 21. In some variants, the motor control comprises other structures, such as a trigger, switch, handgrip, or otherwise.

The pedal 21 can include a foot placement portion and a mount. One end of the foot placement portion can be articulated with respect to the mount. The foot placement portion can maintain a certain angle with respect to the mount in the absence of external force applied to the pedal 21. In some embodiments, the pedal 21 can rotate with respect to the mount.

In some embodiments, the pedal 21 can maintain a specified angle via a reset or biasing mechanism. The reset mechanism can include a spring, such as a torsion spring. The foot placement portion can rotate and maintain a preset angle with the mount due to the force of the torsion spring, for example. The torsion spring can be convenient for installation. In some configurations, other reset mechanisms can be used to maintain the angle between the pedal foot placement portion of the pedal 21 and the mount when the foot placement portion is not depressed.

In some configurations, a distance between the mount and the foot placement portion can be shortened after the user steps on the foot placement portion. In some embodiments, the foot placement portion can be restored to the initial state via the reset mechanism (e.g., the preset angle) after the user releases the pedal 21 (e.g., the user is applying no force or a limited amount of force to the foot placement portion).

In some configurations, the pedal 21 includes a sensor. The sensor can be connected to the controller 6. The sensor can detect a signal (e.g., a displacement signal). The displacement signal can detect how much the pedal 21 is pushed (e.g., downwardly) by the user. For example, detection of displacement of the pedal 21 can be measured by the sensor. Initially, the foot placement portion can be at an initial position when no external force, such as by the user's foot, is applied. The foot placement portion can start to rotate as the user applies a force to the foot placement portion, thus displacing the foot placement portion from the initial position. The sensor can detect the displacement of the foot placement portion of the pedal 21 and can send the displacement signal to the controller 6 of the kart 100. The controller 6 can, on the basis of the displacement signal received from the sensor, control the speed of the kart 100.

The relationship between the displacement signal indicating the travel of the foot placement portion and the desired speed of the kart 100 can be pre-stored in the controller 6. Upon receiving the displacement signal, the controller 6 can control the motor 190 to rotate according to corresponding speed so as to drive the wheel to run at the prospective speed. The relationship between the speed and displacement of the pedal 21 can be directly proportional. For example, in some configurations, the speed increases as the displacement increases. In this way, the user can increase foot pressure on the pedal 21 (resulting in greater displacement of the pedal 21) to speed up the kart 100 and decrease foot pressure to slow down the kart 100. Several such configurations can conveniently control acceleration and/or deceleration of the kart 100. The pedal 21 can control acceleration and/or deceleration, help to avoid interference with manual adjustment of kart direction, prevent mutual influence between speed regulation and steering, improve the operational performance of the kart 100, and/or improve the driving experience to the user, among other benefits.

In some embodiments, the pedal 21 is wirelessly connected to the controller 6. For example, as mentioned above, the pedal 21 can be toggled by the user to increase or decrease the speed of the motor 190 to increase or decrease the speed of the kart 100. When the pedal 21 is toggled by the user, the motor 190 and/or the pedal 21 can be configured to instruct a controller 6 to supply power to the motor 190. For example, the controller 6 can instruct the motor 190 to drive the wheel in response to and/or consistent with the signal from the pedal 21. While control of the kart 100 can be wireless via the pedal 21, some variants have wired connections to connect a throttle, brake, and an on/off switch to the motor 190, as discussed above. Any wired or wireless protocol may be used.

Installation Rack

As previously mentioned, the kart 100 can include an installation rack 9. The installation rack 9 can be positioned at least partially within the installation slot 2. The installation rack 9 can be secured to the body 1 by a fastener 13, such as a mechanical fastener or an adhesive. The installation rack 9 can include a power switch 10. In some embodiments, the power switch 10 can be positioned along or within the installation rack 9. In some embodiments, the power switch 10 can extend through the cover body 3 (see FIG. 1). In some embodiments, activation of the power switch 10 can instruct the battery 5 to supply power to the motor 190. In some embodiments, the switch 10 can be activated by pressing the switch 10. In some embodiments, the switch 10 can be activated wirelessly, such as via wi-fi, Bluetooth®, mobile application, etc. For example, in some embodiments, the kart 100 includes a wired and/or wireless pedal 21 or the switch 10, as discussed above.

In some embodiments, the installation rack 9 can include a charging port 11. The charging port 11 can allow the battery 5 to be charged. In some embodiments, the charging port 11 allows the battery 5 to be charged without removal of the battery 5. In some embodiments, the charging port 11 can be positioned along or within the installation rack 9. In some embodiments, the charging port 11 is positioned adjacent the power switch 10. For example, the charging port 11 can be positioned along a side of the power switch 10.

The installation rack 9, which can include the power switch 10 and/or the charging port 11, can be positioned forward of the seat 8. Several configurations can be convenient to the user during operation. Several configurations can decrease the wiring distance between the charging port 11 and the battery 5. Some configurations can decrease materials and/or cost. Some configurations can allow for a standardized and/or optimized wiring layout. This can help to limit or avoid short circuits, open circuits, and/or the like.

Wheels

As shown in at least FIGS. 1-9, the kart 100 can include a plurality of wheels. In some embodiments, the kart 100 includes at least one front wheel 4 and at least one rear wheel 154. In some embodiments, the at least one front wheel 4 and/or the at least one rear wheel 154 is a caster wheel. The caster wheel can be dynamically engaged to induce and control drift during a turn. In some embodiments, the caster wheel can swivel to constantly maintain contact with the riding surface during a turn. In some embodiments, the caster wheel includes a wheel configured to rotate around an axis of rotation and swivel about a swivel axis. In some embodiments, the axis of rotation is different from the swivel axis. In some embodiments, the axis of rotation is approximately parallel to the riding surface upon which the kart 100 rolls over. The caster wheel can include a fork supporting the wheel, which can allow the wheel to swivel around the swivel axis. When the caster wheels of the kart 100 contact the rolling surface and the caster wheels are free to swivel around their swivel axes, the caster wheels are considered "engaged" and the kart 100 can be steered into a turn. A caster wheel can be "disengaged" to steer the kart 100 normally by either limiting the extent to which the caster wheel can swivel or by shifting the caster wheel (e.g., by tilting the kart 100) so that the wheel does not contact the track surface.

The caster wheels can generally be constructed from high performance casters that include polyurethane wheels mounted to a caster fork via at least one bearing press fitted to the wheel. In some embodiments, the wheels have a 68 mm radius and the bearings are BSB ABEC 7 bearings. Other casters appropriate to the application can be used.

In some embodiments, the swivel axis of the caster wheels can rotate between a rake of 33 degrees and 0 degrees to vertical to control the amount of drift that is allowed. In some embodiments, the extent to which the swivel axis of the caster wheels can rotate relative to vertical is determined by the amount of drift or turn desired in the specific application. In some embodiments, the swivel axis is generally perpendicular to the axis of rotation and/or to a longitudinal axis of the kart 100.

In some embodiments, the kart 100 includes at least one, two, three, four, five, or six or more rear wheels 154. The rear wheels 154 can be mounted to the body 1. In some embodiments, the rear wheels 154 can be mounted to the body 1 below the rearward region 160 of the body 1. In some embodiments, the rear wheels 154 are mounted below the seat 8 and/or the raised region 166. In some embodiments, the rear wheels 154 are mounted to the body 1 at a position that is spaced laterally outward from the seat 8 and/or the raised region 166.

In some embodiments, the rear wheels 154 can be positioned in a neutral position. For example, in the neutral position, the axis of rotation of the rear wheels 154 may be approximately perpendicular to the longitudinal axis of the body 1. In some embodiments, in the neutral position, at least a portion of the rear wheels 154 extends rearwardly beyond the rear side of the body. In some embodiments, in the neutral position, the rear wheels 154 are positioned entirely below the body. In some embodiments, the rear wheels 154 include a biasing mechanism to bias the wheels into the neutral position.

In some embodiments, the kart 100 includes at least one, two, three, four, five, or six or more front wheels 4. In some embodiments, at least one of the one or more front wheels 4 is powered, such as by a motor 190 (e.g., a hub motor 190). In some variants, the front wheel 4 can be non-powered. The at least one rear wheel 154 can be powered or non-powered. In certain embodiments, the front wheel 4 and the at least one rear wheel 154 are powered. The kart 100 can be front wheel driven and/or a rear wheel driven. For example, in some embodiments, the front wheel 4 is the driving wheel.

The kart 100 can include the front wheel 4. The front wheel 4 can be positioned below the forward region 164 of the body 1. In some embodiments, the front wheel 4 can be positioned centrally located along the longitudinal axis of the body 1. In some embodiments, the front wheel 4 can be powered by the motor 190. For example, the front wheel 4 can be powered by a hub motor arrangement, including a hub motor 190. The hub motor 190 can be integrated with and/or form a portion of the front wheel 4. The hub motor 190 can desirably simplify the structure of the kart 100. In some embodiments, the hub motor 190 increases the portability of the kart 100. In some embodiments, the hub motor 190 allows the body 1 to be more flexible.

In some embodiments, the hub motor arrangement powers at least one of the plurality of wheels (e.g., a motor 190 integrated with the front wheel 4 or the rear wheel 154). The hub motor arrangement can include a body or housing, which at least partially encloses the motor 190 and transmission assembly. In some embodiments, a tire or other traction element that contacts a surface upon which the kart 100 is ridden is adjacent to or is directly carried by the housing. A diameter of the traction element can be similar to or slightly larger than a diameter of the housing. In some embodiments, no substantial structural elements (e.g., spokes and rim) are provided between the housing and the traction element. The hub motor arrangement can be well-suited for small diameter wheel applications, such as ride-on vehicles for children, such as the kart 100 illustrated in the embodiments discussed herein, The motor 190 can be a standard, commercially-available small DC brush motor. The kart 100 can include a transmission assembly that is configured to convert the speed and torque of the motor into a speed and torque suitable for the front wheel 4. In some variants, the motor and transmission assembly are configured for accommodation in a housing that is suitably sized and shaped. The motor 190 can be positioned along a center axis of the hub motor arrangement and/or offset axially or laterally to one side of a central plane of the hub motor arrangement or of the traction element. In some configurations, the motor is off-center and/or spaced from the center axis of the hub motor arrangement. A portion of the motor 190 (e.g., an output shaft) can be supported and/or journaled in one or both of a support bearing for the housing and a mount of the hub motor arrangement. In some embodiments, the mount of the hub motor arrangement can include the fork, as described herein. In some arrangements, a portion of the motor 190 is laterally or axially inboard of the support bearing and/or mount that is nearest the motor 190 (if multiple bearings/mounts are provided) and a portion of the motor 190 is laterally or axially outboard of the support bearing and/or mount. In several embodiments, a standard motor can be used along with a transmission assembly suitable to convert the power of the motor into suitable drive power for the rear driving wheel arrangement to provide a relatively low-cost drive system for small or child vehicle applications, including the powered mobility system. In addition, such an arrangement preserves space for the transmission of the hub motor arrangement.

In some embodiments, the hub motor arrangement is not a through-shaft type of arrangement in which an axle member or arrangement passes completely through the center of the hub motor 190, but is a distributed axle arrangement that provides suitable support while permitting the motor 190 to be centrally-located or generally aligned with a central, rotational axis of the hub motor arrangement and to occupy a portion of the axis of rotation. That is, the motor 190 is not a hollow design that surrounds the axis of rotation. Such an arrangement provides a well-balanced hub motor arrangement while permitting the use of a standard, commercially-available "off-the-shelf" motor to keep costs low. In some embodiments, when incorporated into the associated powered mobility system, both sides of the hub motor arrangement may be supported. In some embodiments, the axle supports only one side of the hub motor arrangement. For example, the axle may extend partially inboard the housing of the hub motor and partially outboard the motor 190 on one side of the hub motor arrangement. Although through-shaft type axle designs can also permit a motor to be generally aligned with a central, rotational axis of a motor, such an arrangement would require a custom motor design or at least a large motor design because the axle needs to be sufficient to support a substantial portion of the weight of the kart 100. In the illustrated arrangement, the shaft of the motor may not support any significant weight of at least a portion of the kart 100. In some configurations, the motor could be completely outside of the housing and/or an outside bearing or completely within the housing and/or inboard of the bearing, depending on factors such as the amount of space available, especially in a width direction (along the center or rotational axis). In some configurations, the motor 190 is reasonably accessible without significant disassembly of the hub motor arrangement. For example, in some configurations, the motor 190 can be positioned partially within the housing and/or extend partially outside of the housing. In some configurations, at least a portion of the motor is positioned inboard of the housing and/or within the housing and at least a portion of the motor 190 is located outboard of the housing and/or outside of the housing. Additional details and features related to hub motors can be found in U.S. Pat. No. 9,660,500, filed on Jun. 27, 2014, and U.S. Pat. No. 9,638,285, filed on May 12, 2015, each of which are hereby incorporated by reference in their entirety.

Steering Assembly

The front wheel 4 can be connected to the body 1 via the steering assembly 150. The steering assembly 150 can be connected to the body 1 through an opening in at least a portion of the body 1. For example, the steering assembly 150 can be connected to the body 1 through an opening in the protrusion portion of the body 1. The positioning of the steering assembly 150 can allow the user to comfortably steer the kart 100 when the user is sitting in the seat 8. In some embodiments, the steering assembly 150 allows the kart 100 to be rotated or turned at least 360 degrees.

Figure 12:
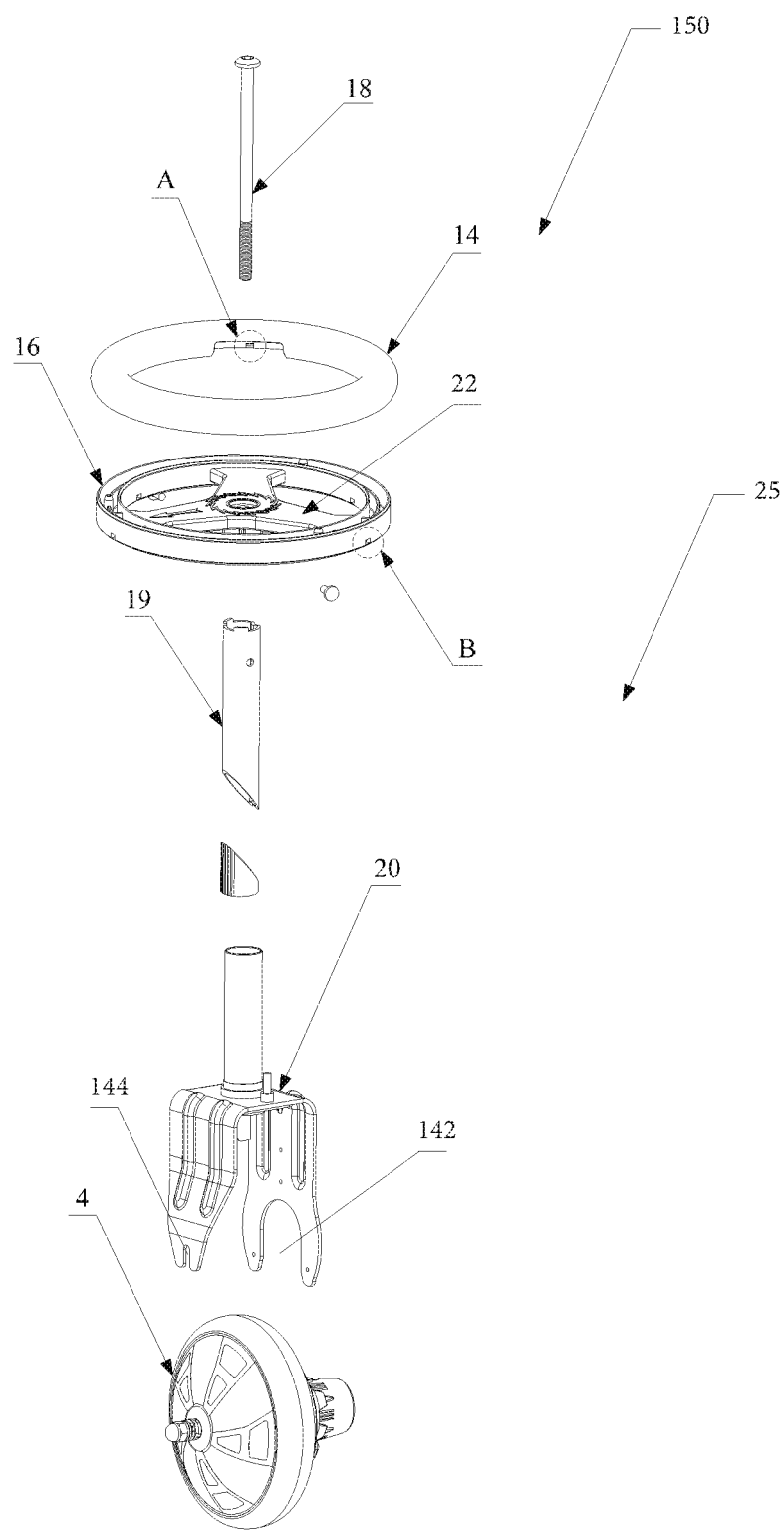
FIG. 12 illustrates an exploded view of a steering assembly of the kart of FIG. 1 showing examples of at least a steering wheel and a front wheel.

FIG. 12 illustrates an exploded view of the steering assembly 150. In some embodiments, the steering assembly 150 includes a steering wheel 7, a steering component 25, and/or the front wheel 4.

In some embodiments, the steering wheel 7 can be turned by the user to change a direction of the front wheel 4, causing the kart 100 to turn. In some embodiments, turning the steering wheel 7 can cause the kart 100 to rotate. In some embodiments, the steering wheel 7 can be rotated at least 360 degrees. In some embodiments, the steering wheel 7 can be turned to cause the kart 100 to spin in a clockwise and/or counterclockwise direction. In some embodiments, the steering assembly 150 includes a biasing mechanism to return the steering assembly 150 (including the steering wheel 7) to the neutral position.

In some embodiments, the steering wheel 7 can include a top cover 14 and a bottom cover 16. The top cover 14 and/or the bottom cover 16 can be ring-shaped. However, other shapes are contemplated, such as square-shaped, rectangular shaped, or oval shaped. In some embodiments, the top cover 14 and/or the bottom cover 16 are shaped to correspond to one another.

The top cover 14 and the bottom cover 16 can be connected through various connection means. In some embodiments, the top cover 14 and the bottom cover 16 can be connected by a snap-fit, screw-fit, and/or a press-fit arrangement. In some embodiments, the steering wheel 7 forms a hollow structure when the top cover 14 is connected to the bottom cover 16.

Figure 13:
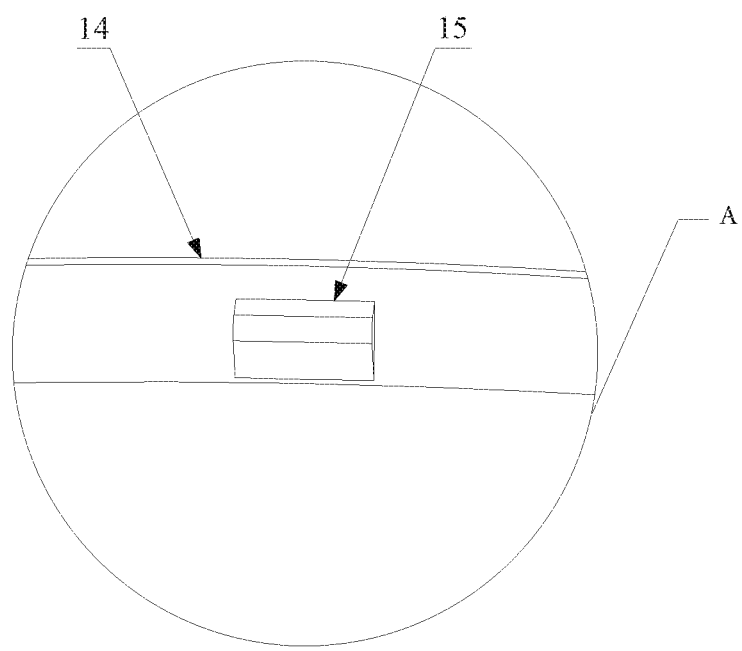
FIG. 13 illustrates a partial close-up view of a portion of the steering wheel of FIG. 12, showing a close-up of part A.

In some embodiments, the top cover 14 and/or the bottom cover 16 can include corresponding engagement features. For example, FIG. 13 illustrates a close-up view of part A, showing an embodiment of the top cover 14. As illustrated, the top cover 14 includes a fixture block 15. The fixture block 15 can form a protrusion that extends outwardly from the top cover 14.

Figure 14:
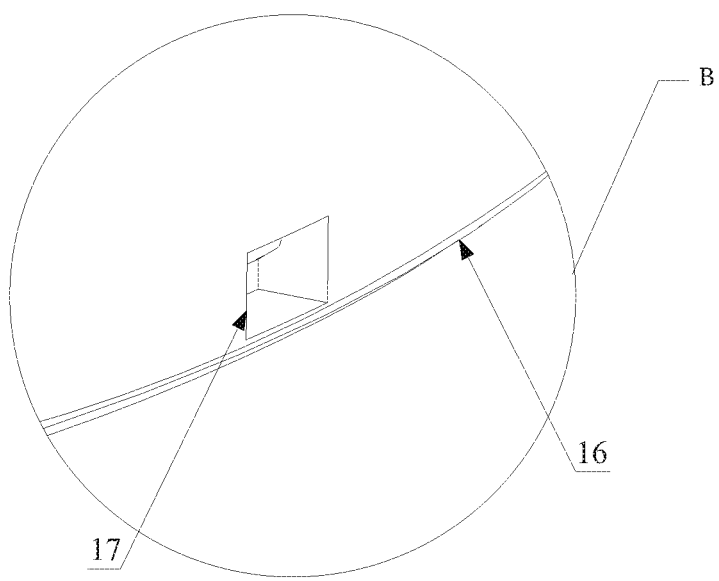
FIG. 14 illustrates a partial close-up view of a portion of the steering wheel of FIG. 12, showing a close-up of part B.

FIG. 14 illustrates a close-up view of part B, showing an embodiment of the bottom cover 16. As shown, the bottom cover 16 can include a card slot 17. The card slot 17 can form an opening in the bottom cover 16. The card slot 17 can be configured to receive at least a portion of the top cover 14, such as the fixture block 15. In some examples, the fixture block 15 can extend into the card slot 17 to secure the top cover 14 to the bottom cover 16. In some embodiments, the card slot 17 can clamp the fixture block 15 within the card slot 17 to retain and/or secure the bottom cover 16 to the top cover 14. The engagement features can allow the steering wheel 7 to be more easily assembled and/or disassembled.

In some embodiments, at least a portion of the steering wheel 7 includes plastic, among other materials. The plastic material can help to decrease the weight of the steering wheel 7. This can help to decrease the overall weight of the kart 100. Some such configurations can help to reduce the driving load, which as described above, can enhance battery life, reduce wear and tear on the kart 100, and/or increase the life-span of certain components, among other things. Some configurations can also help to reduce the amount of material required to form the kart 100.

Figure 12A:
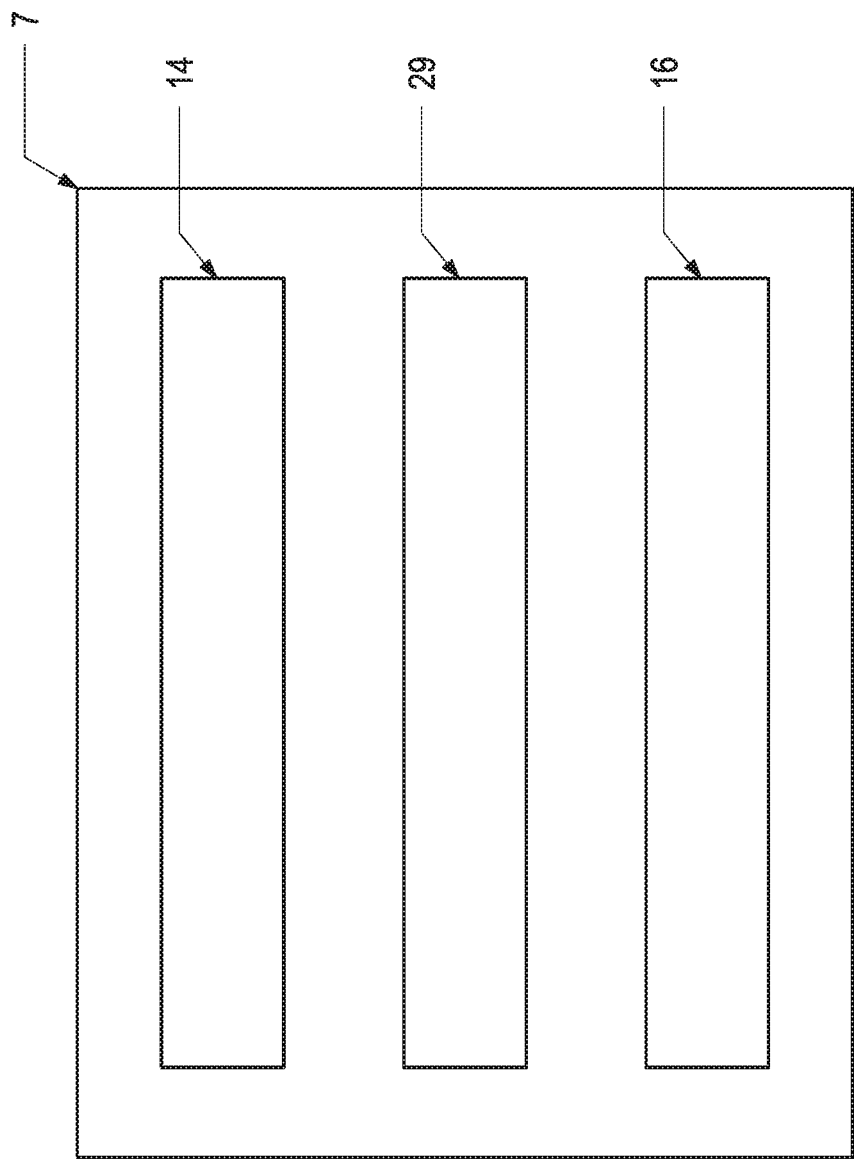
FIG. 12A illustrates a schematic exploded view of certain components of the steering wheel of FIG. 12.

In some embodiments, the steering wheel 7 includes an insert 29 (see FIG. 12A) positioned within the hollow interior space of the steering wheel 7. In some embodiments, the insert 29 can be positioned between the top cover 14 and the bottom cover 16 when assembled. In some embodiments, the insert 29 can be attached to an inner surface of one or more of the top cover 14 and the bottom cover 16. In some embodiments, the insert 29 wraps around at least a portion of the inner surface of one or more of the top cover 14 and the bottom cover 16. The insert 29 can provide additional structure support to the steering wheel 7. In some embodiments, the insert 29 can include metal and/or plastic to provide additional support to the steering wheel 7. In some embodiments, the insert 29 includes metal wrapped with plastic, among other materials.

Referring to FIG. 12, the steering wheel 7 can be connected with the front wheel 4 by the steering component 25. The steering component 25 can include a connection rack 22, a connecting rod 19 and/or a fork 20.

In some embodiments, the connection rack 22 can be positioned within an interior space of at least a portion of the bottom cover 16. In some embodiments, the connection rack 22 is integrally formed with the bottom cover 16. In some embodiments, the connection rack 22 can be connected with the connecting rod 19 by a mechanical fastener, such as a bolt 18. The bolt 18 can secure the steering wheel 7 to the connecting rod 19. In some embodiments, the connection rack 22 can include a protrusion (not shown). The protrusion can connect with one or more other portions of the steering assembly 150, as described in more detail below.

The connecting rod 19 can include various shapes, such as cylindrical, rectangular, or square, among other shapes. In some embodiments, the connecting rod 19 includes a groove (not shown). In some embodiments, the groove of the connecting rod 19 can receive at least a portion of the protrusion of the connection rack 22. In several configurations, the connection between the groove and the protrusion can secure the steering wheel 7 to the connecting rod 19. In some embodiments, the connection between the groove and the protrusion can provide additional support to the structure of the steering assembly 150 to increase the firmness of the steering assembly 150, and/or enhance operating performance, among other benefits.

The connecting rod 19 can be connected to a fork 20. In some embodiments, the connecting rod 19 is integrally formed with the fork 20. The fork 20 can be substantially U-shaped. In some embodiments, the fork 20 can surround at least a portion of the front wheel 4 to secure the front wheel 4 to the steering wheel 7. In some embodiments, the fork 20 includes a first side and a second side. In some embodiments, the first side and the second side of the fork 20 include the same or similar shapes. In some embodiments, the first side and the second side of the fork 20 include different shapes. In some embodiments, the second side is approximately flat. In some embodiments, the second side of the fork 20 extends downwardly. In several configurations, the first side of the fork 20 has an upper portion and a lower portion. In some embodiments, the upper portion is approximately parallel to the second side. In some embodiments, the lower portion extends outwardly away from the upper portion. In some embodiments, the lower portion is contoured to match the shape of the hub motor 190 of the front wheel 4. In some embodiments, the first side includes a first set of prongs and the second side includes a second set of prongs. The first set of prongs can be configured to receive and/or secure one side of the front wheel 4 and/or hub motor 190, such as the axle. In some embodiments, the second set of prongs can be configured to receive and/or secure another side of the front wheel 4 and/or hub motor 190, such as another portion of the hub motor 190. In some embodiments, a recess 144 between adjacent prongs of the first set of prongs can be narrower than a recess 142 between adjacent prongs of the second set of prongs. In some embodiments, the recess 144 is smaller than the recess 142. In some embodiments, the recess 144 is the same size as or larger than the recess 142.

Anti-Sway Features

FIG. 15 shows a bottom perspective view of the kart 100. One or more sides of the body 1 can be provided respectively with an anti-sway feature 180 and/or anti-roll feature 180. In some embodiments, the anti-sway feature 180 does not contact and/or impact the rolling surface when the kart 100 is in normal operation (e.g., moving straight ahead). In some embodiments, when the kart 100 is positioned approximately horizontal and/or parallel to the rolling surface, and supported by one or more of the front wheel 4 and/or the rear wheels 154, the anti-sway features 180 extend from the body 1 and are spaced apart from the riding surface. In this state of the kart 100, the anti-sway features 180 do not influence operation of the kart 100. For example, the anti-sway features do not drag along the riding surface. In some embodiments, when the kart 100 inclines or tilts to a certain angle from side to side, one or more of the anti-sway features 180 can engage (e.g., touch) the rolling surface. This can help to prevent the kart 100 from further inclination or tilting and possible toppling when the kart 100 turns. The anti-sway features 180 can be advantageous, for example, for karts provided with only one front wheel 4 and/or only one rear wheel 154. The selected distance from the anti-sway feature 180 to the rolling surface can be designed on the basis of a desired anti-sway angle. The anti-sway features 180 can be connected to the bottom of the body 1, so as to not influence the overall appearance of the kart 100. In some embodiments, the lowermost part of the anti-sway features 180 is within the diameter of the front wheel and, as shown, for example, in FIGS. 3 and 4.

The anti-sway features 180 can be arranged at the forward region 164 of the kart 100. In some embodiments, the anti-sway features 180 are positioned at the rearward region 160 of the kart 100. In some embodiments, the forward region 164 of the kart 100 is prone to tipping if the kart 100 inclines during running. To inhibit or prevent the kart 100 from tipping over, the anti-sway features 180 can be located at the forward region 164 of the kart 100. In some variants, the anti-sway features 180 can be arranged at a distance behind at least a portion of the front wheel 4 (e.g., a front edge of the wheel). Some configurations may not only inhibit, limit, or prevent a rollover, but can effectively inhibit, limit, or prevent the kart 100 from tipping forward.

Certain Terminology

Certain terminology may be used in the description for the purpose of reference only, and thus is not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. For example, as the context may dictate, the term "generally parallel" can mean something that departs from exactly parallel by less than or equal to 15°. Furthermore, as the context may dictate, the term "generally perpendicular" can mean something that departs from exactly, perpendicular by less than or equal to 15°. Furthermore, as the context may dictate, the term "generally aligned" can mean something that departs from exactly, aligned by less than or equal to 15°.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

CONCLUSION

Various karts have been disclosed in the context of certain embodiments and examples above. However, this disclosure extends beyond the specifically disclosed embodiments to other alternative embodiments and/or uses and obvious modifications and equivalents thereof. In particular, while the karts have been described in the context of illustrative embodiments, certain advantages, features, and aspects of the karts may be realized in a variety of other applications. Various features and aspects of the disclosed embodiments can be combined with or substituted for one another in order to form varying modes of the improvements. The scope of this disclosure should not be limited by the particular disclosed embodiments described herein.

Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Some embodiments have been described in connection with the accompanying drawings. The figures are drawn to scale, but such scale should not be interpreted as limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of karts have been disclosed. Although the improvements have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. A ridable kart, comprising:
    a kart body including:
        an installation slot comprising an opening;
    a cover body rotatably connected with the kart body at one end of the opening of the installation slot;
    a plurality of rear caster wheels;
    a steering assembly connected with the kart body comprising:
        a front wheel, the front wheel including a hub motor arrangement having a hub motor integrated with the front wheel;
        a steering wheel connected to the front wheel, the steering wheel configured to allow a user to turn the kart;
    a battery configured to supply power to the hub motor; and
    a controller configured to cause the battery to supply power to the hub motor,
    wherein the battery and the controller are secured within the installation slot.

2. The ridable kart of claim 1, wherein the kart body is integrally formed by blow molding.

3. The ridable kart of claim 1, further comprising a seat configured to support the user during operation of the kart.

4. The ridable kart of claim 3, wherein the kart body includes a base and a raised region, and wherein the seat is connected with the raised region to support the user at an elevated position relative to the base.

5. The ridable kart of claim 3, wherein the installation slot is positioned forward of the seat.

6. The ridable kart of claim 3, wherein the installation slot is positioned between the steering assembly and the seat.

7. The ridable kart of claim 3, wherein the cover body has a generally U-shape, wherein the cover body is rotatably connected to the end of the opening of the installation slot adjacent to the seat.

8. The ridable kart of claim 1, further comprising an installation rack connected with the kart body, the installation rack comprising a power switch, wherein the installation rack is positioned between the installation slot and the steering assembly.

9. The ridable kart of claim 1, further comprising a charging port connected to the battery.

10. The ridable kart of claim 1, wherein the kart body includes a protruding portion, wherein the steering assembly is connected with the kart body at the protruding portion.

11. The ridable kart of claim 1, wherein the battery is secured to the installation slot by a clamping member positioned adjacent the battery, the clamping member comprising:
    a fastener configured to pass through the clamping member to secure the clamping member and the battery to the kart body.

12. The ridable kart of claim 1, wherein the steering wheel comprises:
    a top cover comprising a fixture block;
    a bottom cover comprising a card slot; and
    a connection rack coupled with an inner side of the bottom cover,
    wherein the fixture block is clamped within the card slot to secure the top cover to the bottom cover.

13. The ridable kart of claim 12, wherein the steering wheel further comprises an insert positioned within an interior space between the top cover and the bottom cover.

14. The ridable kart of claim 13, wherein the top cover includes a first material, wherein the bottom cover includes the first material, and the insert comprises a second material.

15. The ridable kart of claim 14, wherein the first material includes plastic and the second material includes metal.

16. The ridable kart of claim 12, wherein the steering assembly further comprises a steering component connecting the steering wheel to the front wheel, wherein the steering component comprises:
    a connecting rod connected to the connection rack by a second fastener; and
    a fork connected to the connecting rod and the front wheel.

17. The ridable kart of claim 16, wherein the fork comprises:
    a first set of prongs including a first interior space configured to receive an axle; and
    a second set of prongs including a second interior space configured to receive at least a portion of the hub motor,
    wherein the first interior space is narrower than the second interior space.

18. The ridable kart of claim 1, further comprising a pedal connected with the kart body to control a rotational speed of the front wheel.

19. The ridable kart of claim 3, wherein the seat is configured to be positioned below the steering wheel.

20. The ridable kart of claim 3, wherein the seat comprises a back portion and a base, wherein the back portion is configured to be generally aligned with a rear side of the kart body.

\* \* \* \* \*